United States Patent
Brown et al.

(10) Patent No.: US 11,451,703 B2
(45) Date of Patent: Sep. 20, 2022

(54) METHOD AND SYSTEM FOR CUSTOMIZING CAMERA PARAMETERS

(71) Applicant: SAMSUNG ELECTRONICS CO., LTD., Suwon-si (KR)

(72) Inventors: Michael Scott Brown, Toronto (CA); Abhijith Punnappurath, Toronto (CA)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 46 days.

(21) Appl. No.: 17/094,213

(22) Filed: Nov. 10, 2020

(65) Prior Publication Data
US 2021/0297582 A1 Sep. 23, 2021

Related U.S. Application Data

(60) Provisional application No. 63/046,550, filed on Jun. 30, 2020, provisional application No. 62/993,647, filed on Mar. 23, 2020.

(51) Int. Cl.
*H04N 5/232* (2006.01)
*G06N 3/08* (2006.01)

(52) U.S. Cl.
CPC .......... *H04N 5/23216* (2013.01); *G06N 3/08* (2013.01); *H04N 5/232933* (2018.08)

(58) Field of Classification Search
CPC . H04N 5/23216; H04N 5/232933; G06N 3/08
See application file for complete search history.

(56) References Cited

U.S. PATENT DOCUMENTS

| 7,835,569 | B2* | 11/2010 | Marcu | ............... H04N 9/04515 |
| | | | | 382/162 |
| 9,571,736 | B2* | 2/2017 | Lee | ......................... H04N 9/07 |
| 2008/0088858 | A1 | 4/2008 | Marcu et al. | |
| 2013/0315476 | A1 | 11/2013 | Paris et al. | |

(Continued)

FOREIGN PATENT DOCUMENTS

JP 2019-106694 A 6/2019

OTHER PUBLICATIONS

Hold-Geoffroy et al., "A Perceptual Measure for Deep Single Image Camera Calibration," arXiv:1712.01259v3, Apr. 22, 2018, Total 12 pages.

(Continued)

*Primary Examiner* — Ahmed A Berhan
(74) *Attorney, Agent, or Firm* — Sughrue Mion, PLLC

(57) ABSTRACT

An apparatus for customizing camera parameters is provided. The apparatus includes: an image signal processor; and a processor configured to execute instructions to: generate a first edited image based on a first original image, the first original image including first original image data and first metadata indicating a first pattern of processed RGB colors; identify a first mapping function by analyzing the first pattern with respect to a fixed pattern of unprocessed-RGB color space samples; generate first unprocessed image data based on the first mapping function and the first original image; identify image signal processor adjustment parameters based on the first unprocessed image data and the first edited image; and image signal processor parameters of the image signal processor based on the image signal processor adjustment parameters.

26 Claims, 17 Drawing Sheets

(56) References Cited

U.S. PATENT DOCUMENTS

2018/0173993 A1    6/2018    Cogranne et al.
2019/0108621 A1    4/2019    Condorovici

OTHER PUBLICATIONS

Communication dated Feb. 15, 2021, issued by the International Searching Authority in counterpart International Application No. PCT/KR2020/015731 (PCT/ISA/220, 210, 237).

* cited by examiner

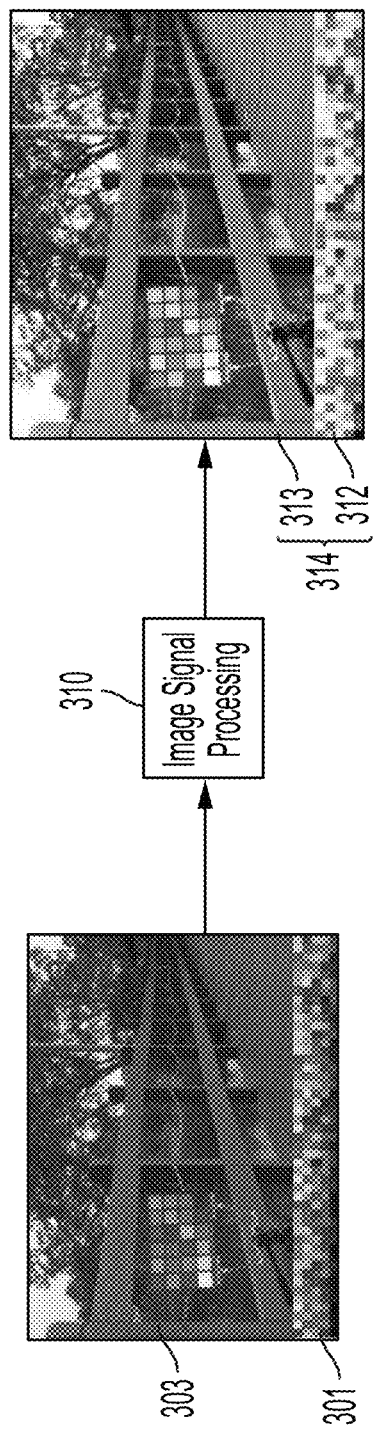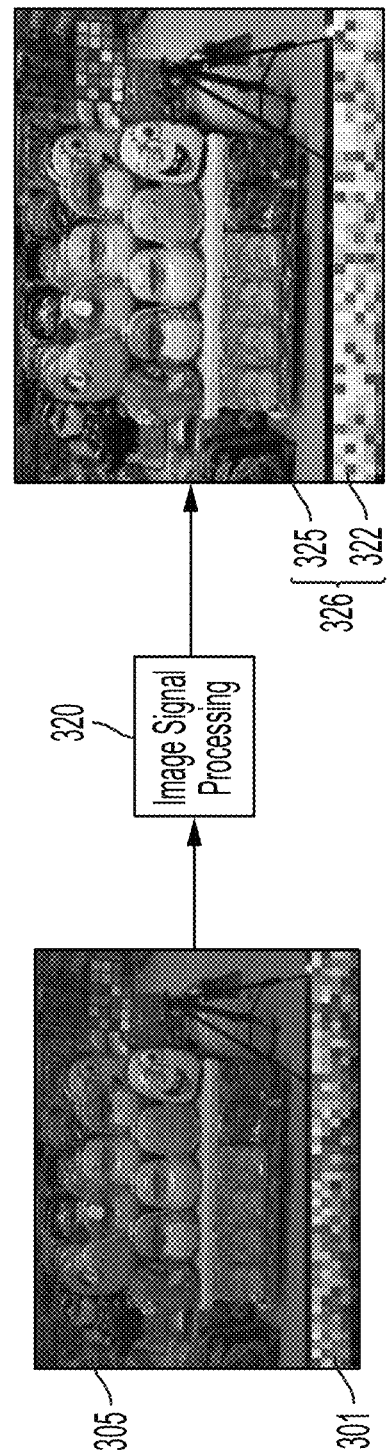
FIG. 4A
FIG. 4B

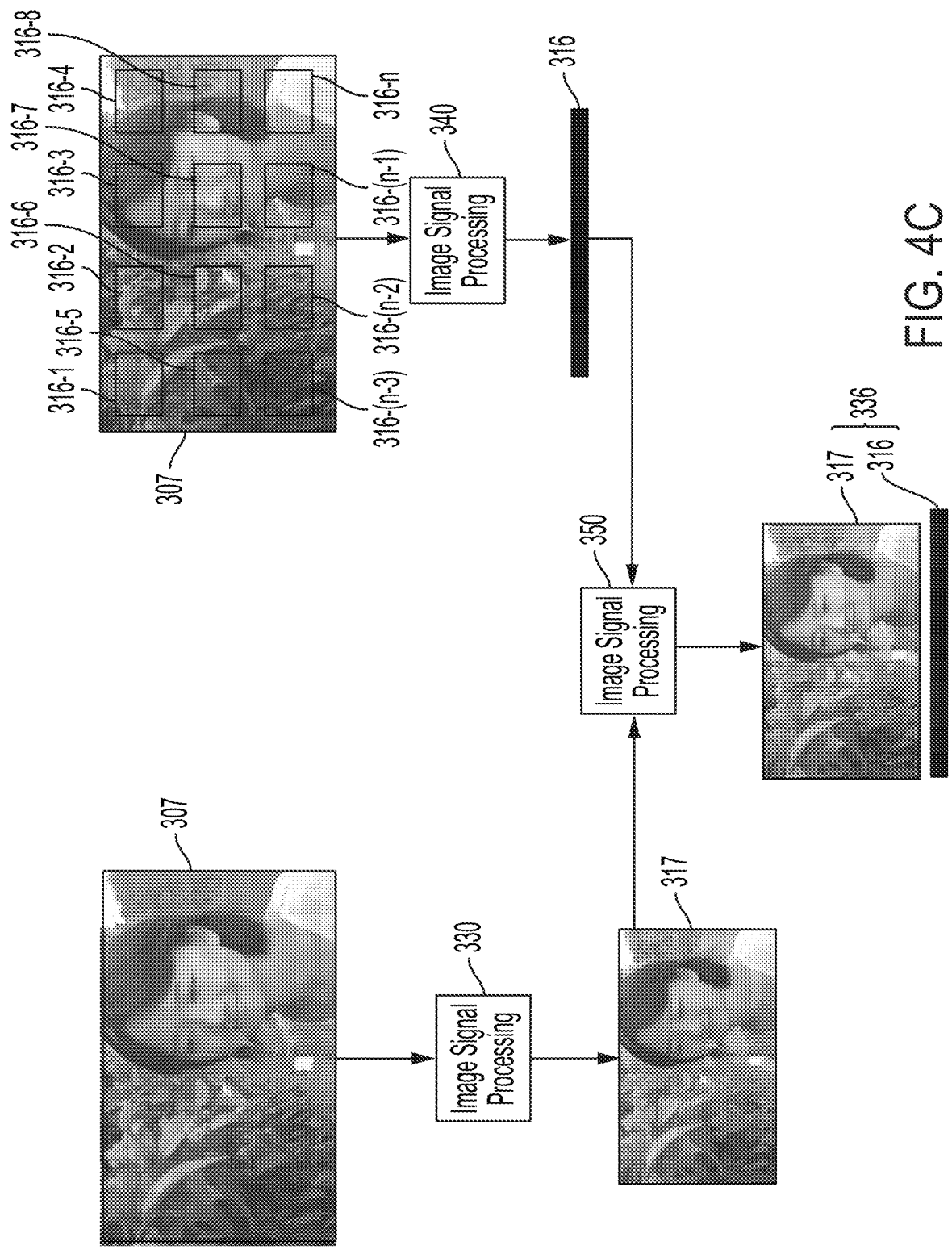

METHOD AND SYSTEM FOR CUSTOMIZING CAMERA PARAMETERS

CROSS-REFERENCE TO RELATED APPLICATION

This application is based on and claims priority under 35 U.S.C. § 119 to U.S. Provisional Patent Application No. 62/993,647, filed Mar. 23, 2020, in the U.S. Patent and Trademark Office, and U.S. Provisional Patent Application No. 63/046,550, filed Jun. 30, 2020 in the U.S. Patent and Trademark Office, the disclosures of which are incorporated by reference herein in their entireties.

BACKGROUND

1. Field

The disclosure relates to customizing parameter settings of an image signal processor (ISP) through indirect observation of actions related to image editing and image preferences.

2. Description of Related Art

A mobile device may include a camera having an image sensor and an image signal processor (ISP). The image signal processor is dedicated hardware that renders a raw sensor image to a final output image encoded to a display-referred format. The unprocessed sensor image may be referred to as a raw-RGB image and the ISP-rendered display-referred image may be referred to as a processed display-referred image. When a user of the mobile device uses the camera to capture an image of a scene, the image sensor may generate a raw-RGB (i.e., unprocessed) image of the scene. The image sensor may provide the raw-RGB image in a raw image format to the image signal processor for processing.

Professional photographers often prefer to shoot in an unprocessed raw-RGB image format. Shooting in raw-RGB provides users the ability to render the raw-RGB image to user controlled styles via photo-editing software. In addition, certain image processing tasks, such as image deblurring, white-balance manipulation, and photometric stereo are more effective when applied to images in a raw-RGB format. While raw-RGB offers advantages over display-referred images, most consumers still do not shoot in a raw format. One reason is because raw images are typically 4-6 times larger than display-referred encoded images. Moreover, raw-format images are not easily shared as they require rendering to a display-referred color space before viewing. Due to these drawbacks, the vast major of captured images are saved in a display-referred format.

In this regard, the image signal processor may process the raw image by performing a number of routines to the sensor's raw-RGB image. These routines may include white-balance, chromatic adaptation, color manipulation, demosaicing, noise reduction, image sharpening, and the like. For example, the image signal processor may process the raw image through an image signal processor pipeline. Further, the image signal processor may output a processed display-referred image in a format such as Tagged Image File Format (TIFF), Joint Photographic Experts Group (JPEG), and the like. The display-referred image may be encoded according to an industry standard color space, such as sRGB, Adobe RGB or ProPhoto RGB. The processed display-referred image may be stored, transmitted, or processed further via post processing. The unprocessed image data may be, for example, 10-bit data, 12-bit data, 14-bit data or 16-bit data, and the processed display-referred image may be, for example, 8-bit data, 10-bit data, 12-bit data, 14-bit data or 16-bit data. The raw-RGB image data is typically discarded after being processed, and is not saved on a device.

The image signal processor may be configured with parameter settings, and may process raw images from the image sensor in accordance with the parameter settings. For example, the routines performed by the ISP may be performed in accordance with the parameter settings, and the visual appearance of the processed display-referred image may depend on the particular parameter settings of the ISP. Accordingly, ISPs that are configured with different parameter settings may generate processed display-referred images that include visually different appearances and thereby impart a particular aesthetic to a captured image.

Typically, an image signal processor in a device is pre-configured with particular and fixed parameter settings. The fixed parameter settings may be set in the factory. The same image signal processor may be implemented in devices provided by different manufacturers. Each manufacture may provide a unique set of the fixed parameter settings. In this regard, first devices that are manufactured by a first company and second devices that are manufactured by a second company may include the same ISP. However, because the first devices and the second devices have different fixed parameter settings for the ISP, display-referred images generated by the first devices have a different appearance than display-referred images generated by the second devices. Additionally, some manufacturers have different fixed parameter settings which vary based on geolocation. For example, a mobile device that is manufactured for North America may have a first set of fixed parameter settings, whereas a mobile device that is manufactured by the same company for Asia may have a second set of fixed parameter settings. Each set of fixed parameter settings is set by "golden eye" experts that identify the parameter settings in order to obtain desired image characteristics. Accordingly, a user of a mobile device cannot adjust the fixed parameter settings of the ISP. In this way, the customizability, functionality and extensibility of the mobile device are inhibited, and the user experience is reduced.

Also, an image signal processor may include a large number of parameter settings. Moreover, the manner in which the parameters affect image processing may not be apparent to a user. Therefore, even if it were possible to manually change the parameter settings, such a process would be time-consuming, error-prone, and/or difficult for a user of the mobile device.

SUMMARY

To address the foregoing technical problems, embodiments of the present disclosure relate to indirectly learning photo-finishing preferences based on how images are edited or based on characteristics of images that are identified. The parameter settings of the image signal processor can be modified based on these preferences to customize onboard processing of an unprocessed (or raw) image.

One or more embodiments provide a mobile device that identifies parameter setting adjustments by indirectly observing how images are edited using editing software on the mobile device.

One or more embodiments provide a mobile device that identifies parameter setting adjustments by indirectly observing the types of images that are identified on the mobile device. For example, an image may be identified when the image is "liked" or "favorited" on a social media platform.

One or more embodiments provide a mobile device that includes a sensor which generates raw-RGB image data that is then processed by an image signal processor to produce a display-referred image. When a display-referred image is edited, an original display referred image may be stored with an edited display referred image. The mobile device may convert the original display-referred image back to its raw format using a plurality of approaches. The image signal processor parameters may be updated in a manner that when applied to the original display-referred image an image is generated that is visually similar to the after-edit display referred image. The image signal processor parameters may be updated on the camera hardware such that future captured images will be processed in customized manner.

One or more embodiments provide a mobile device that is able to generate raw-RGB image data based on metadata indicating a pattern of processed colors.

One or more embodiments provide a mobile device that is able to generate raw-RGB image data based on metadata indicating sampled raw-RGB pixel values corresponding to known spatial locations in the display-referred image.

One or more embodiments provide a mobile device that is able to use a trained neural network to generate raw-RGB image data based on a display-referred image. The neural network may be trained using pairs of raw-RGB images and corresponding processed display-referred images.

According to embodiments of the disclosure, an apparatus for customizing camera parameters includes: an image sensor; an image signal processor; a touch display; a memory storing instructions; and a processor configured to execute the instructions to: provide, via the touch display, an image editing interface; generate, via the image editing interface, a first edited image based on a first original image, wherein the first original image comprises first original image data and first metadata indicating a first pattern of processed RGB colors; identify a first mapping function by analyzing the first pattern with respect to a fixed pattern of unprocessed-RGB color space samples; generate first unprocessed image data based on the first mapping function and the first original image; identify a first plurality of image signal processor adjustment parameters based on the first unprocessed image data and the first edited image; update a plurality of image signal processor parameters of the image signal processor based on the first plurality of image signal processor adjustment parameters; and control the image signal processor to generate, using the updated plurality of image signal processor parameters, a second original image comprising second original image data and second metadata indicating a second pattern of processed RGB colors based on second unprocessed image data received from the image sensor.

The processor may be further configured to execute the instructions to generate the second pattern of processed RGB colors by processing the fixed pattern using the updated plurality of image signal processor parameters together with the second unprocessed image data.

The processor may be further configured to execute the instructions to: provide, via the touch display, an image gallery interface comprising a plurality of gallery images; receive, via the image gallery interface, an indication corresponding to a first gallery image from among the plurality of gallery images; generate first gallery unprocessed image data corresponding to the first gallery image by analyzing the first gallery image using a neural network; identify a second plurality of image signal processor adjustment parameters based on the first gallery unprocessed image data and the first gallery image indicated via the image gallery interface; and update the plurality of image signal processor parameters of the image signal processor based on the second plurality of image signal processor adjustment parameters.

The processor may be further configured to execute the instructions to: control the image signal processor to sample third unprocessed image data received from the image sensor; control the image signal processor to generate third original image data by processing the third unprocessed image data using the updated plurality of image signal processor parameters; and generate a third image by appending the samples of the third unprocessed image data to the third original image data.

The unprocessed-RGB color space samples of the fixed pattern represent uniform samples of a full color space of the image sensor, each processed RGB color of the first pattern may respectively correspond to one unprocessed-RGB color space sample of the fixed pattern, and the processor may be further configured to identify the first mapping function by comparing each processed RGB color of the first pattern with a corresponding unprocessed-RGB color space sample of the fixed pattern.

The processor may be further configured to execute the instructions to identify the first plurality of image signal processor adjustment parameters using a neural network, and the neural network may be trained based on a plurality of unprocessed images, each of which is processed using a plurality of image signal processor parameters.

The plurality of image signal processor parameters may include a first plurality of image signal processor parameters corresponding to a first image category and a second plurality of image signal processor parameters corresponding to a second image category, and the processor is further configured to execute the instructions to: identify whether the first edited image corresponds to the first image category or the second image category; update the first plurality of image signal processor parameters according to the first plurality of image signal processor adjustment parameters based on the first edited image corresponding to the first image category; and update the second plurality of image signal processor parameters according to the first plurality of image signal processor adjustment parameters based on the first edited image corresponding to the second image category.

The processor may be further configured to execute the instructions to individually identify each of the first plurality of image signal processor adjustment parameters.

A plurality of pre-defined sets of parameters may be stored in the memory. Each of the plurality of pre-defined sets of parameters may include a plurality of parameters respectively corresponding to the plurality of image signal processor parameters. The processor may be further configured to execute the instructions to: identify one of the plurality of pre-defined sets of parameters based on the first unprocessed image data and the first edited image; and identify the first plurality of image signal processor adjustment parameters based on the plurality of parameters of the identified pre-defined set of parameters.

According to embodiments of the disclosure a method of customizing parameters of an image signal processor of a mobile device includes: providing, via a touch display, an image editing interface; generating, via the image editing interface, a first edited image based on a first original image, wherein the first original image comprises first original image data and first metadata indicating a first pattern of processed RGB colors; identifying a first mapping function by analyzing the first pattern with respect to a fixed pattern of unprocessed-RGB color space samples; generating first unprocessed image data based on the first mapping function and the first original image; identifying a first plurality of image signal processor adjustment parameters based on the first unprocessed image data and the first edited image; updating a plurality of image signal processor parameters of the image signal processor based on the first plurality of image signal processor adjustment parameters; and generating, using the updated plurality of image signal processor parameters, a second original image comprising second original image data and second metadata indicating a second pattern of processed RGB colors based on second unprocessed image data received from an image sensor.

The method may further include generating the second pattern of processed RGB colors by processing the fixed pattern using the updated plurality of image signal processor parameters together with the second unprocessed image data.

The method may further include: providing, via the touch display, an image gallery interface comprising a plurality of gallery images; receiving, via the image gallery interface, an indication corresponding to a first gallery image from among the plurality of gallery images; generating first gallery unprocessed image data corresponding to the first gallery image by analyzing the first gallery image using a neural network; identifying a second plurality of image signal processor adjustment parameters based on the first gallery unprocessed image data and the first gallery image indicated via the image gallery interface; and updating the plurality of image signal processor parameters of the image signal processor based on the second plurality of image signal processor adjustment parameters.

The method may further include: sampling third unprocessed image data received from the image sensor; generating third original image data by processing the third unprocessed image data using the updated plurality of image signal processor parameters; and generating a third image by appending the samples of the third unprocessed image data to the third original image data.

The unprocessed-RGB color space samples of the fixed pattern represent uniform samples of a full color space of the image sensor, each processed RGB color of the first pattern may respectively correspond to one unprocessed-RGB color space sample of the fixed pattern, and the identifying the first mapping function may include comparing each processed RGB color of the first pattern with a corresponding unprocessed-RGB color space sample of the fixed pattern.

The method may further include identifying the first plurality of image signal processor adjustment parameters using a neural network, and the neural network may be trained based on a plurality of unprocessed images, each of which is processed using a plurality of image signal processor parameters.

The plurality of image signal processor parameters may include a first plurality of image signal processor parameters corresponding to a first image category and a second plurality of image signal processor parameters corresponding to a second image category, and the method may further include: identifying whether the first edited image corresponds to the first image category or the second image category; updating the first plurality of image signal processor parameters according to the first plurality of image signal processor adjustment parameters based on the first edited image corresponding to the first image category; and updating the second plurality of image signal processor parameters according to the first plurality of image signal processor adjustment parameters based on the first edited image corresponding to the second image category.

The identifying the first plurality of image signal processor adjustment parameters may include individually identifying each of the first plurality of image signal processor adjustment parameters.

The identifying the first plurality of image signal processor adjustment parameters may include: identifying one of a plurality of pre-defined sets of parameters based on the first unprocessed image data and the first edited image, wherein each of the plurality of pre-defined sets of parameters comprises a plurality of parameters respectively corresponding to the plurality of image signal processor parameters; and identifying the first plurality of image signal processor adjustment parameters based on the plurality of parameters of the identified pre-defined set of parameters.

According to embodiments of the disclosure a non-transitory computer-readable storage medium stores instructions configured to cause a processor to: provide, via a touch display, an image editing interface; generate, via the image editing interface, a first edited image based on a first original image, wherein the first original image comprises first original image data and first metadata indicating a first pattern of processed RGB colors; identify a first mapping function by analyzing the first pattern with respect to a fixed pattern of unprocessed-RGB color space samples; generate first unprocessed image data based on the first mapping function and the first original image; identify a first plurality of image signal processor adjustment parameters based on the first unprocessed image data and the first edited image; update a plurality of image signal processor parameters of an image signal processor based on the first plurality of image signal processor adjustment parameters; and generate, using the updated plurality of image signal processor parameters, a second original image comprising second original image data and second metadata indicating a second pattern of processed RGB colors based on second unprocessed image data received from an image sensor.

The instructions may be further configured to cause the processor to generate the second pattern of processed RGB colors by processing the fixed pattern using the updated plurality of image signal processor parameters together with the second unprocessed image data.

The instructions may be further configured to cause the processor to: provide, via the touch display, an image gallery interface comprising a plurality of gallery images; receive, via the image gallery interface, an indication corresponding to a first gallery image from among the plurality of gallery images; generate first gallery unprocessed image data corresponding to the first gallery image by analyzing the first gallery image using a neural network; identify a second plurality of image signal processor adjustment parameters based on the first gallery unprocessed image data and the first gallery image indicated via the image gallery interface; and update the plurality of image signal processor parameters of the image signal processor based on the second plurality of image signal processor adjustment parameters.

The instructions may be further configured to cause the processor to: sample third unprocessed image data received from the image sensor; generate third original image data by processing the third unprocessed image data using the updated plurality of image signal processor parameters; and generate a third image by appending the samples of the third unprocessed image data to the third original image data.

The unprocessed-RGB color space samples of the fixed pattern represent uniform samples of a full color space of the image sensor, each processed RGB color of the first pattern may respectively correspond to one unprocessed-RGB color space sample of the fixed pattern, and the instructions may be further configured to cause the processor to identify the first mapping function by comparing each processed RGB color of the first pattern with a corresponding unprocessed-RGB color space sample of the fixed pattern.

The instructions may be further configured to cause the processor to identify the first plurality of image signal processor adjustment parameters using a neural network, and the neural network may be trained based on a plurality of unprocessed images, each of which is processed using a plurality of image signal processor parameters.

The instructions may be further configured to cause the processor to identify the first plurality of image signal processor adjustment parameters by individually identifying each of the first plurality of image signal processor adjustment parameters.

The instructions may be further configured to cause the processor to identify the first plurality of image signal processor adjustment parameters by: identifying one of a plurality of pre-defined sets of parameters based on the first unprocessed image data and the first edited image, wherein each of the plurality of pre-defined sets of parameters comprises a plurality of parameters respectively corresponding to the plurality of image signal processor parameters; and identifying the first plurality of image signal processor adjustment parameters based on the plurality of parameters of the identified pre-defined set of parameters.

BRIEF DESCRIPTION OF THE DRAWINGS

The above and other aspects, features, and aspects of embodiments of the disclosure will be more apparent from the following description taken in conjunction with the accompanying drawings, in which:

FIGS. 4A, 4B and 4C show examples of generating image data with the metadata according to embodiments.

DETAILED DESCRIPTION

The following detailed description of example embodiments refers to the accompanying drawings. The same reference numbers in different drawings may identify the same or similar elements.

Expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, or all of a, b, and c.

Figure 1:
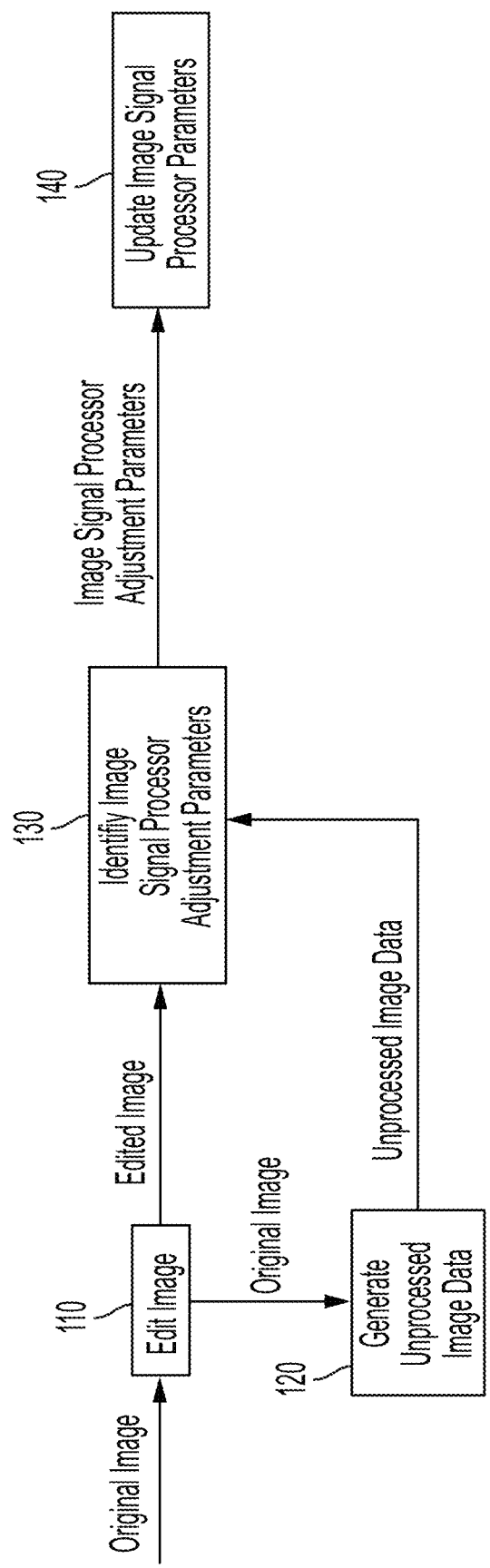
FIG. 1 is a diagram of an overview of a process or customizing parameter settings of an image signal processor of a camera of a mobile device based on a user edited image according to embodiments.

FIG. 1 is a diagram of an overview of a process or customizing parameter settings of an image signal processor of a camera of a mobile device based on a user edited image according to embodiments.

As shown in FIG. 1, an original image, which may be a processed display-referred image that is encoded in a display-referred format according to an industry standard color space, such as sRGB, Adobe RGB or ProPhoto RGB, may be edited in a process 110. The process 110 may be performed on a mobile device. For example, the original image may be edited through a user interface for editing images that is provided on the mobile device. Based on interactions with the user interface, various characteristics of the original image may be modified. For example, the process 110 may modify brightness, exposure, contrast, saturation, hue or other characteristics of the original image.

When process 110 has been completed, an edited version of the original image is generated and stored in association with the original image. The edited version of the original image may be encoded in a display-referred format. For example, the original image and the edited version of the original image may form an image pair.

Process 120 is performed to generate unprocessed image data based on the original image. For example, the process 120 may be initiated when the process 110 is completed. The unprocessed image data may be similar to unprocessed, or raw, image data that is generated by an image sensor of the camera of the mobile device. In this regard, process 120 is performed to undo processing performed by an ISP to recover the raw image data generated by an image sensor. The unprocessed image data generated in process 120 may be recovered raw image data that is the same as or substantially similar to the raw image data generated by the image sensor. Various methods for generating the unprocessed image data will be discussed below in detail.

Process 130 is performed to identify image signal processor adjustment parameters based on the edited image generated in process 110 and the unprocessed image data obtained in the process 120. The identified image signal processor adjustment parameters may be used to adjust the internal parameter settings of the image signal processor so that the image signal processor outputs images more similar to the edited image.

For example, the parameters of the image signal processor may include white-balance, chromatic adaptation, color manipulation, de-mosaicing, noise reduction, image sharpening, chroma-enhancement, skin-enhancement, select-color enhancement. Embodiments are not limited to these specific parameters, and additional adjustment parameters may be identified for other parameters of the image signal processor. For example, the process 130 may identify one or more of the parameters of the image signal processor that may be changed in order for the image signal processor to generate images more similar to the edited image. The one or more parameters may be identified based on the edited image and the recovered raw image data. For each of the identified parameters, an adjustment parameter may be identified. For example, each of the image signal processor adjustment parameters may indicate a change to be made to a corresponding image signal processor parameter.

Process 140 is performed to change, or update, one or more of the image single processor parameters currently set in the image signal processor according to the image signal processor adjustment parameters. Once the image signal processor parameters have been updated, the image signal processor has been customized.

Subsequently, when the camera of the mobile device is used to capture images, the image signal processor will process raw image signals received from the image sensor according to the updated image signal processor parameters. In this regard, a user is able to customize the onboard photo-finishing process performed by the image signal processor and thereby customize the aesthetic of images processed by the image signal processor.

Figure 2:
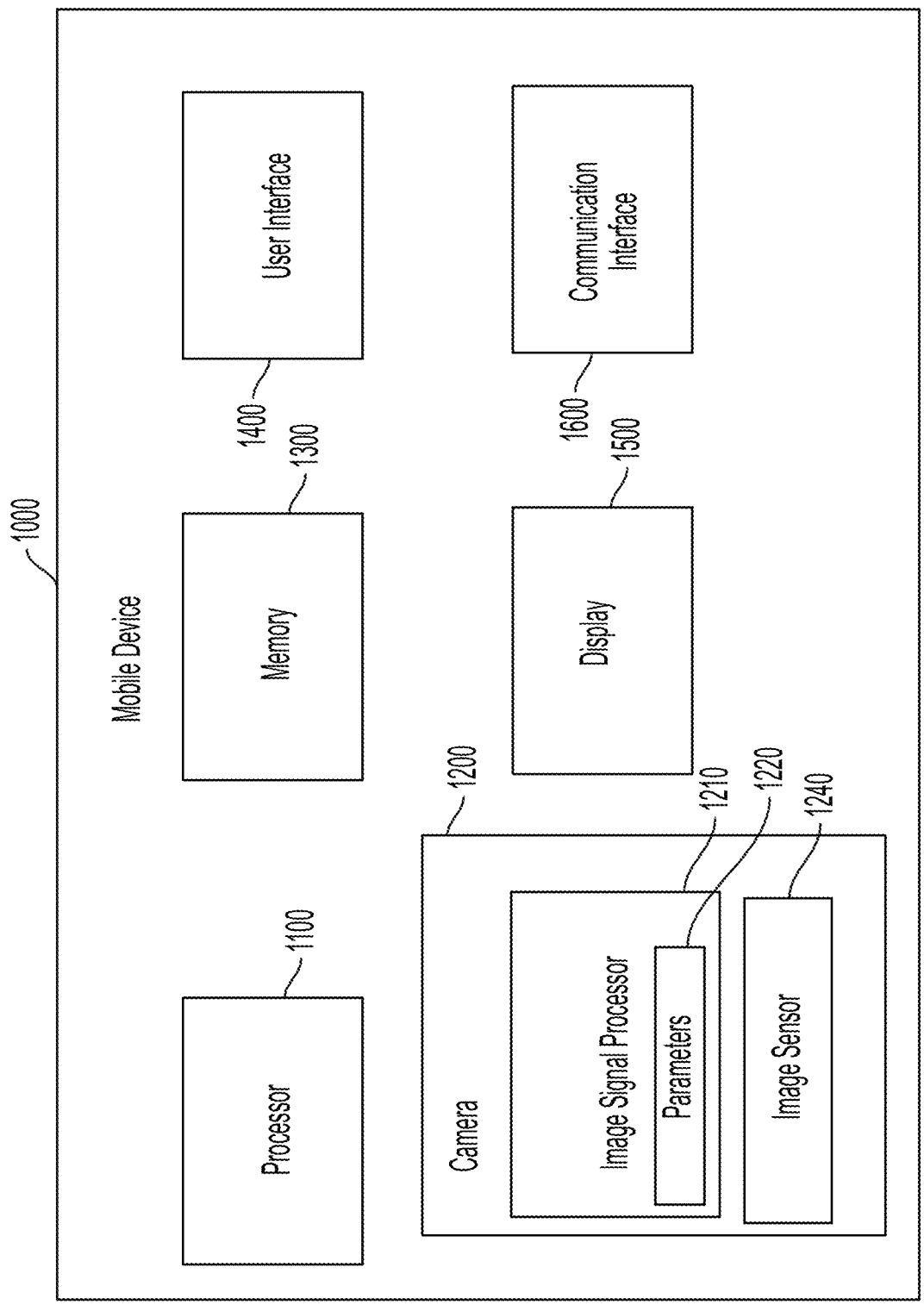
FIG. 2 is a diagram of components of a mobile device according to embodiments.

FIG. 2 is a diagram of components of a mobile device according to embodiments. As shown in FIG. 2, the mobile device 1000 may include a processor 1100, a camera 1200 including an image signal processor 1210 which operates based on parameters 1220 and an image sensor 1240, a memory 1300, a user interface (UI) 1400, a display 1500, and a communication interface 1600.

The processor 1100 may be configured to adjust the parameters 1220 of the image signal processor 1210 of the camera 1200 of the mobile device 1000. For example, the processor 1100 may control operation of the processes 110, 120, 130 and 140 discussed above. For example, the processor 1100 may be a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), and the like.

The camera 1200 may be configured to capture an image of a scene. The camera 1200 may include the image signal processor 1210 and the image sensor 1240. The image signal processor (ISP) 1210 may be configured to process an unprocessed (e.g., raw) image received from the image sensor 1240 using the parameters 1220. For example, the image signal processor 1210 may be, an image processing engine, an image processing unit (IPU), an integrated signal processor, a processor, and the like. The image sensor 1240 may be configured to generate unprocessed (e.g., raw) image data based on light that is incident on the image sensor 1240. For example, the image sensor 1240 may be a charge coupled device (CCD) or a complementary metal-oxide semiconductor (CMOS) sensor, and the like.

The parameters 1220 of the image signal processor 1210 may be settings of parameters of the image signal processor 1210 that control how the image signal processor 1210 processes unprocessed, or raw, image data. For example, the image signal processor 1210 may be configured with various parameters that may be associated with various settings. Accordingly, a particular combination of parameter settings may constitute a profile, and different permutations of parameter settings may constitute different profiles. The parameters may include, as examples, white-balance, chromatic adaptation, color manipulation, chroma-enhancement, skin-enhancement, selective-color-enhancement, noise reduction, lens shading correction, color correction, gamma correction, sharpness enhancement, auto exposure correction, auto focus correction, de-mosaicing, color space conversion, hue, saturation, contrast, and the like.

The memory 1300 may be configured to store instructions that, when executed by the processor 1100, cause the processor 1100 to adjust the parameters of the image signal processor 1210 of the camera 1200 of the mobile device 1000 based on a user input received via the UI 1400. For example, the memory 1300 may include a non-transitory computer-readable medium such as a flash memory type memory, a hard disk type memory, a multimedia card micro type memory, a card type memory (e.g., secure digital (SD) or extreme digital (XD) memory), a random access memory (RAM), a static random access memory (SRAM), read-only memory (ROM), electrically erasable programmable read-only memory (EEPROM), programmable read-only memory (PROM), a magnetic memory, a magnetic disk, an optical disc, and the like.

The user interface (UI) 1400 may be configured to receive a user selection in relation to an image displayed via the display 1500. For example, the UI 1400 may be a touchscreen, a button, a dome switch, a keyboard, a keypad, a mouse, a switch, a microphone, a transceiver, a sensor, and the like.

The display 1500 may be configured to display a plurality of images. For example, the display 1500 may be a liquid crystal display (LCD), an organic light-emitting diode (OLED) display, and the like.

The communication interface 1600 may be configured to communicate with external devices. For example, the communication interface 1600 may be a cellular interface, a Bluetooth interface, a wireless fidelity (Wi-Fi) interface, a Wi-Fi Direct (WFD) interface, a Bluetooth Low Energy (BLE) interface, an Infrared Data Association (IrDA) interface, a Near Field Communication (NFC) interface, a laser communication network interface, a universal serial bus (USB) interface, and Ethernet interface, an optical interface, and the like.

The number and arrangement of components shown in FIG. 2 are provided as an example. In practice, the mobile device 1000 may include additional components, fewer components, different components, or differently arranged components than those shown in FIG. 2. A set of components (e.g., one or more components) of the mobile device 1000 may perform one or more functions described as being performed by another set of components of the mobile device 1000.

Figure 3:
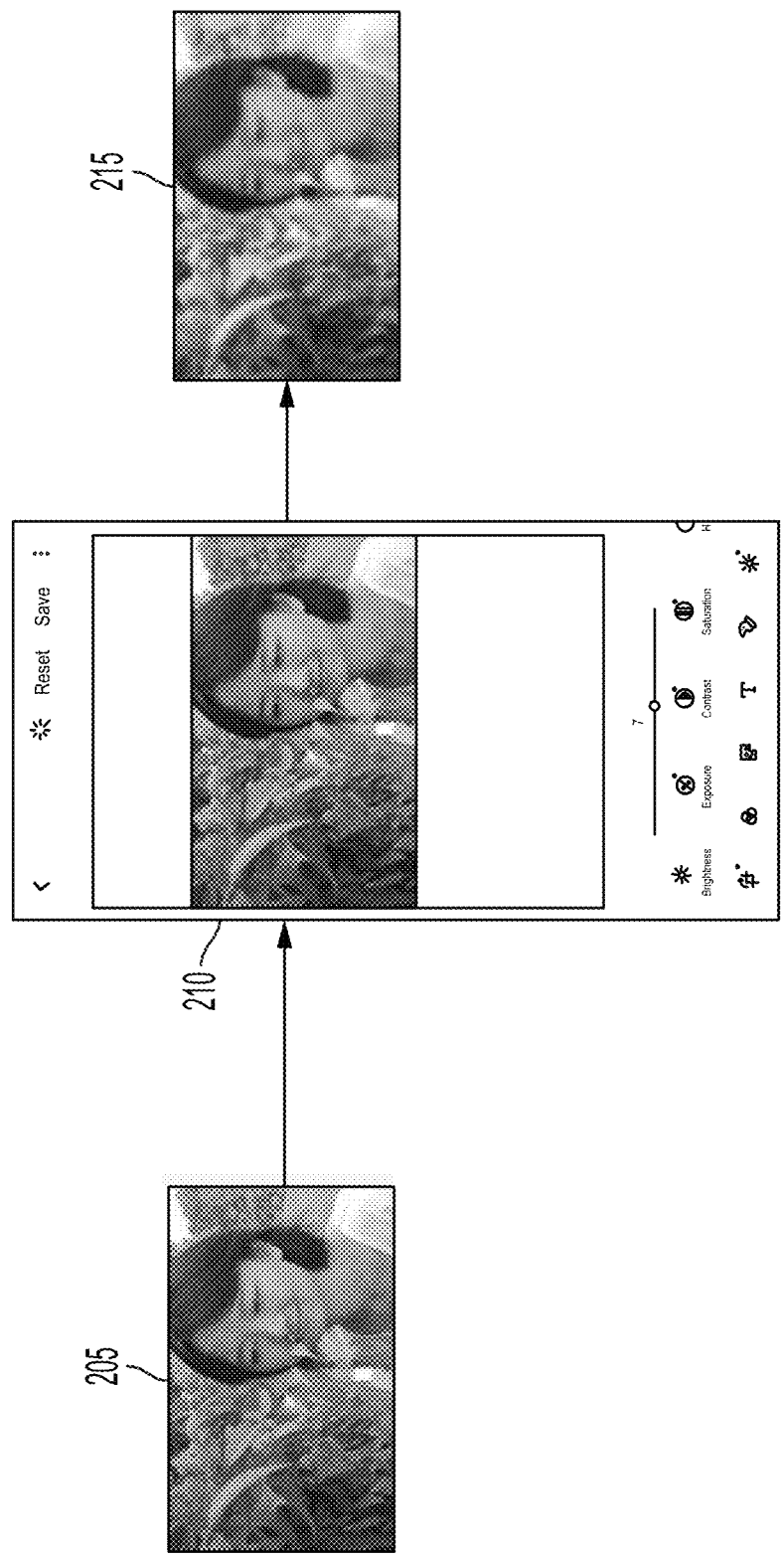
FIG. 3 is a diagram of an overview of a process for editing an image according to embodiments.

FIG. 3 is a diagram of an overview of a process for editing an image according to embodiments.

As shown in FIG. 3, original image 205 may be edited through editing process 210. The editing process 210 may be performed via a user interface provided on a mobile device. As shown, a characteristic to be modified, such as brightness, exposure, contrast, saturation, hue, or other characteristic, may be selected. The selected characteristic may be modified by moving a sliding user interface element. The displayed image may be updated as the sliding user interface element is moved in order to provide visual feedback to a user. Once the image is edited, the edited image may be saved. For example, the edited image may be saved in association with the original image as an image pair.

When the process 110 is completed, process 120 may be performed to generate unprocessed data based on the original image corresponding to the edited image.

As discussed above, different methods may be used for generating the unprocessed image data in the process 120. Reverting a processed display-referred image, such as a display-referred image encoded according to the sRGB industry standard, back to its original unprocessed raw sensor state is a challenging problem. This is because many of the operations applied by the image signal processor are nonlinear and proprietary. The image signal processor is essentially a "blackbox" to the end user.

According to embodiments, the processed display-referred image may include both data that is indicative of the original image, as well as metadata indicative of processing performed by the image signal processor. The metadata may be subsequently used to generate, or recover, the unprocessed image data.

The metadata may be generated by the image signal processor when the image is captured. For example, the image signal processor may append a fixed pattern of unprocessed RGB colors (i.e., raw-RGB colors) to unprocessed image data (i.e., an raw-RGB image) that is generated by the image sensor. The fixed pattern may be independent of the image data generated by the image sensor.

The fixed pattern is then processed by the image signal processor along with the unprocessed image data generated by the image sensor. The processed pattern corresponding to the fixed pattern is stored as metadata with the processed display-referred image data.

The metadata may be used by the mobile device to generate unprocessed image data because the metadata is representative of the processing performed by the image signal processor. That is, because the pattern of unprocessed RGB colors is a fixed pattern, a relationship between the known fixed pattern and the metadata may be indicative of a relationship between the processed display-referred image data and the unprocessed (i.e., raw) image data. Based on the relationship between the metadata and the fixed pattern, an inversion (or de-rendering) function may be identified. In particular, the relationship may indicate how the specific colors of the fixed pattern were modified by the image signal processor. The inversion function may be applied to the processed display-referred image data to generate, or recover, unprocessed image data that is similar to the unprocessed image data generated by the image sensor.

FIGS. 4A, 4B and 4C show examples of generating image data with the metadata according to embodiments.

For example, a fixed pattern 301 of unprocessed RGB colors may be generated by uniformly sampling unprocessed-RGB color space. The fixed pattern 301 may be appended, at the time of capture, as a pixel mask for all captured images. This pattern may be rendered by the image signal processor along with the captured image.

For example, as shown in FIG. 4A, the fixed pattern 301 of unprocessed RGB colors (i.e., raw-RGB colors) may be appended to unprocessed image data 303 (i.e., a raw-RGB image) corresponding to a first image. The image signal processor may generate first image data 314 by processing by the fixed pattern 301 and the unprocessed image data 303 corresponding to the first image. The image data output by the image signal processor may be a processed display-referred image and include processed pattern 312, which corresponds to the fixed pattern 301, as well as first processed display-referred image data 313 to form first image data 314. The display-referred image data corresponding to the processed pattern 312 may be stored as metadata of the first image data 314.

For example, as shown in FIG. 4B, the same fixed pattern 301 of unprocessed RGB colors may be appended to unprocessed image data 305 corresponding to a second image. The image signal processor may generate second image 326 by processing by the fixed pattern 301 and the unprocessed image data 305 corresponding to the second image. Processed pattern 322 corresponding to the fixed pattern 301 may be appended to the second processed display-referred image data 325 to form second image 326 The RGB image data corresponding to the processed pattern 322 may be stored as metadata of the second image 326.

As shown, the fixed pattern 301 is the same for both the first image in FIG. 4A and the second image of FIG. 4B. The image signal processing 310, performed by the image signal processor, processes the fixed pattern 301 and the unprocessed image data 303 according to first settings. The image signal processing 320, performed by the image signal processor, processes the fixed pattern 301 and the unprocessed image data 305 according to second settings. The first settings and the second settings are different. In this regard, the processed pattern 312 appended to the first processed display-referred image data 313 is not the same as the processed pattern 322 appended to the second processed display-referred image data 325.

For example, the raw samples of the fixed pattern 301 may be selected by uniformly sampling the full space of unprocessed-RGB colors that the image sensor is capable of producing. For example, an image sensor may produce raw-RGB image data with a bit depth of 10. In this case, the total number of unique raw-RGB color values that the image sensor can record is 1024×1024×1024. The 3D RGB volume is binned uniformly using 32×32×32 samples. This fixed raw-RGB pattern may be appended to each captured image and rendered through the image signal processor with the full frame. The resulting 32×32×32 rendered RGB samples constitute the metadata. These additional pixels represent only 96 KB of overhead to the full size image.

Embodiments are not limited to raw-RGB image data with a bit depth of 10. In this regard, according to embodiments raw-RGB image data may be, for example, 12-bit raw-RGB image data, 14-bit raw-RGB image data, or 16-bit raw-RGB image data. According to embodiments, the 3D RGB volume of 12, 14 or 16 bit values may be binned uniformly using 32×32×32 samples. According to embodiments, the 3D RGB volume may be binned uniformly using different samples, such as 16×16×16 samples, 64×64×64 samples or 128×128×128 samples.

In the process 120, a mapping function, such as an inversion function or de-rendering function, may be identified based on a relationship between the fixed pattern 301 and a processed pattern stored as metadata with processed display-referred image data. The mapping function may be used to invert the processed display-referred image data to unprocessed raw-RGB image data. In particular, the relationship may indicate how the unprocessed image data was modified by the image signal processor. The inversion function may be applied to the processed display-referred image data to generate, or recover, unprocessed image data that is similar to the unprocessed raw-RGB image data generated by the image sensor.

As discussed above, embodiments relate to metadata that is generated based on the fixed pattern 301. However, embodiments are not limited thereto. For example, according to embodiments, when an image is captured, processed display-referred image data may be generated by the image signal processor based on the unprocessed image data received from the image sensor, and the unprocessed image data may be sampled and stored as metadata with processed display-referred image data. For example, the unprocessed image data may be sampled on a sparse grid and stored as the metadata.

The metadata corresponding to the unprocessed image data may be used by the mobile device to generate unprocessed image data because a relationship between processed display-referred image data and the unprocessed image data stored as metadata is representative of the processing performed by the image signal processor.

Based on the relationship between the metadata and the processed display-referred image data, a mapping function, such as an inversion function or de-rendering function, may be identified. In particular, the relationship may indicate how the specific samples of the unprocessed image data were modified by the image signal processor. The inversion function may be applied to the processed display-referred image data to generate, or recover, unprocessed image data that is similar to the unprocessed raw-RGB image data generated by the image sensor.

For example, as shown in FIG. 4C, unprocessed image data 307, which for example may be 16-bit raw-RGB data, may be processed in image signal processing 330 to generate third processed display-referred image data 317, which may be for example 8-bit RGB data. The unprocessed image data 307 may also be sampled n times in image signal processing 340 to generate unprocessed image samples 316. For example, the unprocessed image samples 316 may include n samples, sample 316-1 through sample 316-n, which may be sampled from the unprocessed image data 307 in the image signal processing 340. Image signal processing 350 may be performed to append the unprocessed image samples 316 to the third processed display-referred image data 317 as metadata to form third image 336.

In the process 120, a mapping function may be identified based on the unprocessed image samples 316 and corresponding portions of the third processed display-referred image data 317. The mapping function may be used to invert the processed display-referred data to unprocessed (i.e., raw-RGB) image data.

FIGS. 5A, 5B, 5C and 5D show examples of generating, or recovering, unprocessed image data based on processed display-referred image data according to embodiments.

As discussed above, embodiments relate to generating unprocessed image data that is similar to raw-RGB data generated by the image sensor based on processed display-referred image data and metadata appended to the processed display-referred image data.

Figure 5A:
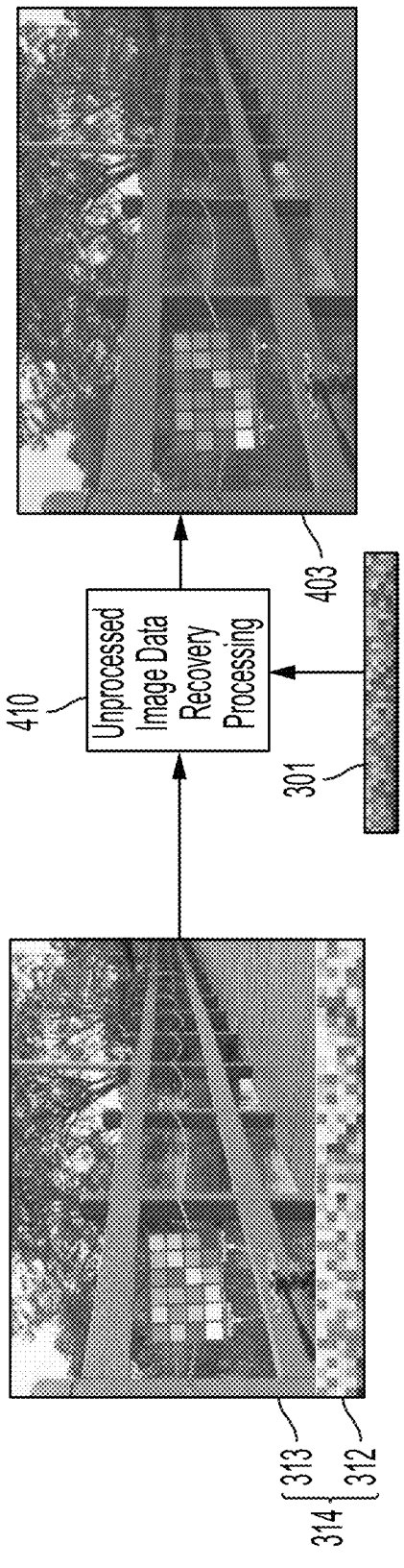
FIGS. 5A, 5B, 5C and 5D show examples of generating, or recovering, unprocessed image data based on processed display-referred image data according to embodiments.

As shown in FIG. 5A, the first image data 314 may include first processed display-referred image data 313 and processed pattern 312. The processed pattern 312 may correspond to the fixed pattern 301. Based on the fixed pattern 301 and the processed pattern 312, a mapping function (i.e., an inversion or de-rendering function) may be identified based on the unprocessed image data samples of the fixed pattern 301 and their corresponding RGB values of the processed pattern 312. The mapping function may be used to generate, or recover, unprocessed image data 403 in operation 410. For example, the unprocessed image data 403 may correspond to the unprocessed image data 303.

Figure 5B:
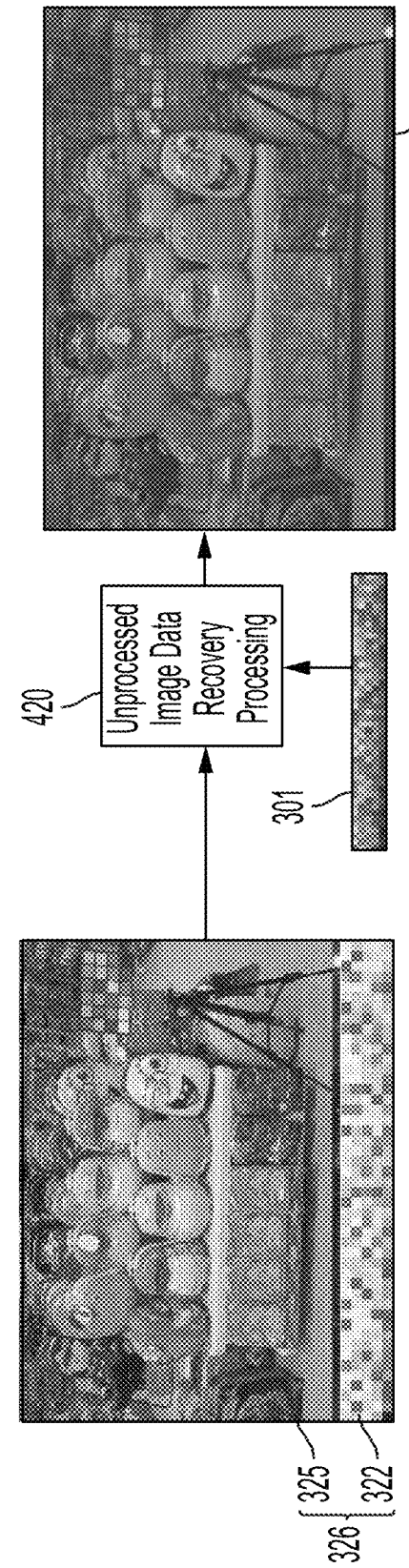

As shown in FIG. 5B, the second image 326 may include second processed display-referred image data 325 and processed pattern 322. The processed pattern 322 may correspond to the fixed pattern 301. Based on the fixed pattern 301 and the processed pattern 322, a mapping function (i.e., an inversion or de-rendering function) may be identified based on the unprocessed image data samples of the fixed pattern 301 and their corresponding RGB values of the processed pattern 322. The mapping function may be used to generate, or recover, unprocessed image data 405 in operation 420. For example, the unprocessed image data 405 may correspond to the unprocessed image data 305.

For example, a reverse mapping function from processed display-referred image data to raw-RGB may be identified based on rendered processed display-referred image samples and their corresponding a priori known fixed raw-RGB samples. The mapping may be implemented via a standard scatter point interpolation framework, and can be computed post-capture when the user edits the image.

Because the first image data 314 and the second image data 326 were processed with different image signal processor settings, the reverse mapping function in operation 410 will be different than the reverse mapping function in operation 420.

Figure 5C:
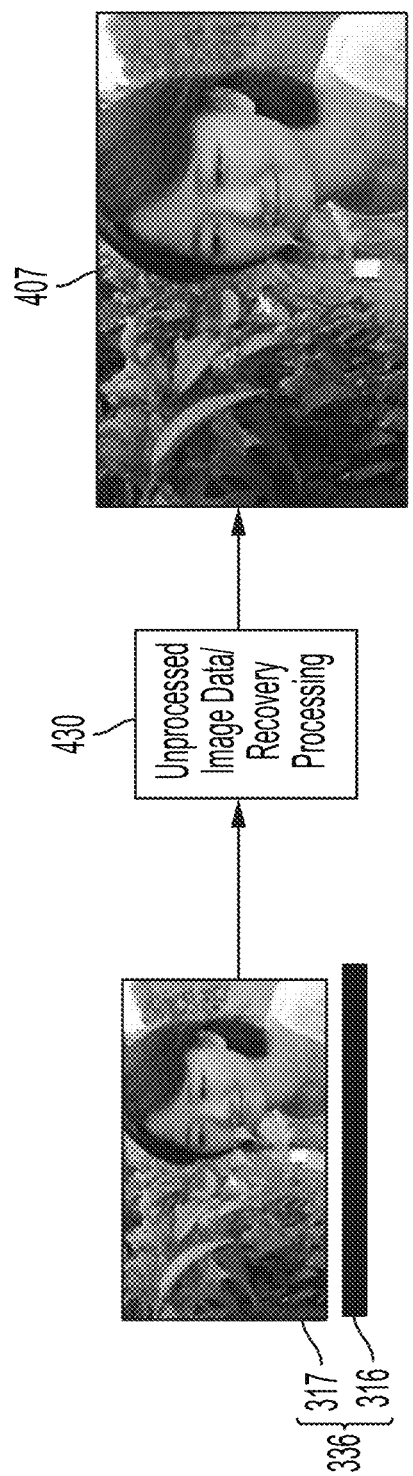

As shown in FIG. 5C, the third image 336 may include third processed display-referred image data 317 and unprocessed image samples 316. The unprocessed image samples 316 may correspond to pixels of the third processed display-referred image data 317. Based on the unprocessed image samples 316 and corresponding pixels of the third processed display-referred image data 317, a mapping function (i.e., an inversion or de-rendering function) may be identified. The mapping function may be used to generate, or recover, unprocessed image data 407. For example, the unprocessed image data 407 may correspond to the unprocessed image data 307.

According to embodiments, unprocessed image data that is similar to raw-RGB data generated by the image sensor may be generated, or recovered, from processed display-referred image data corresponding to an edited image. For example, a neural network may be used to generate unprocessed image data corresponding to an edited image that is not associated with a corresponding original image.

Figure 5D:
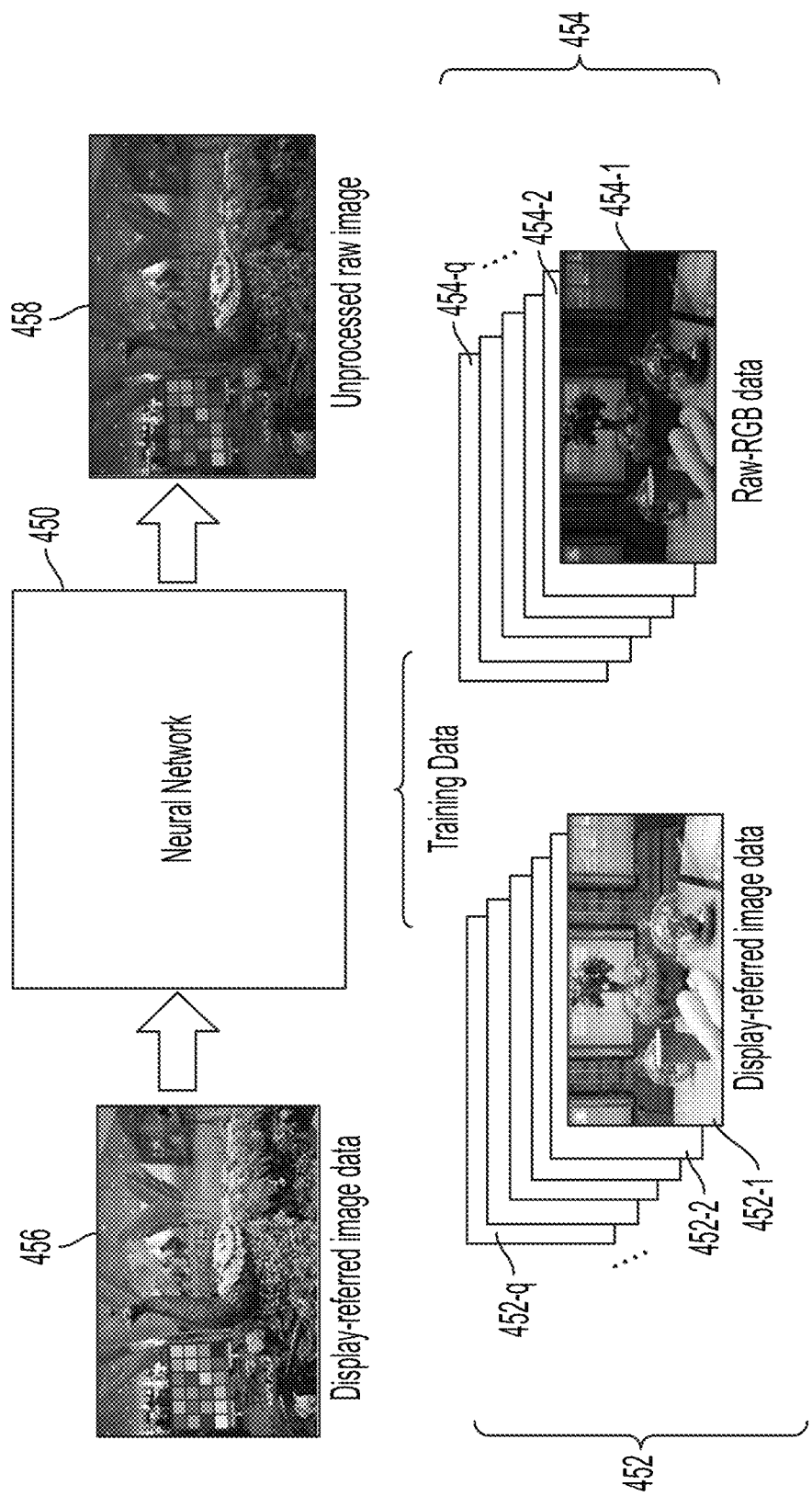

As shown in FIG. 5D, a neural network 450 may be trained based on sets of display-referred image data 452 and corresponding raw image data 454. Each set may include display-referred image data and corresponding raw-RGB data. For example, display-referred image data 452-1 may correspond to raw-RGB data 454-1, and the display-referred image data 452-1 and the raw-RGB data 454-1 may form a set. Similarly, display-referred image data 452-2 through 452-q may respectively correspond to raw-RGB data 454-2 through 454-q. The neural network 450 may process display-referred image data 456 and provide unprocessed image data 458 that is similar to raw-RGB data generated by an image sensor.

Figure 6A:
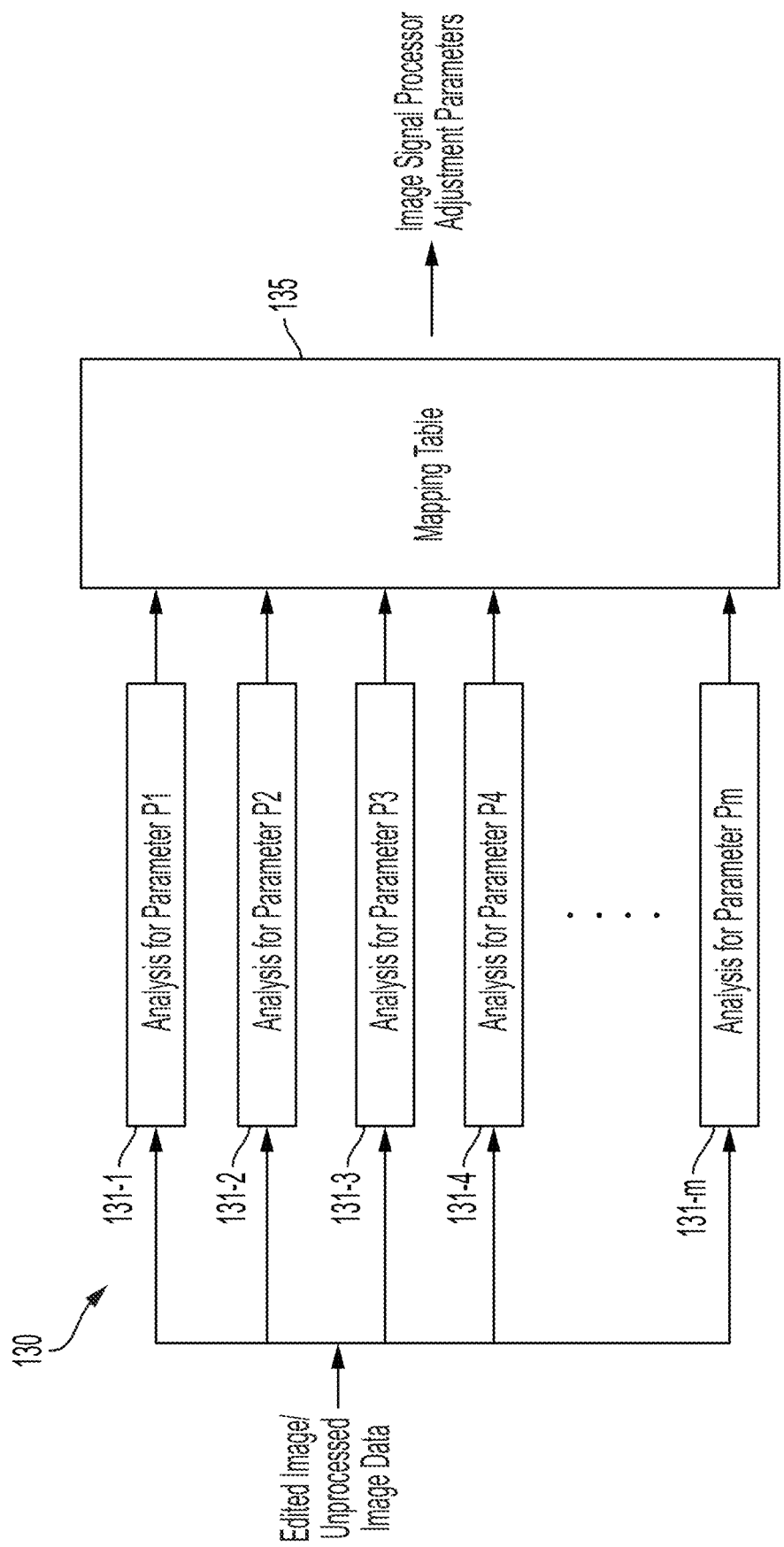
FIGS. 6A and 6B show examples of identifying image signal processor adjustment parameters according to embodiments.
Figure 6B:
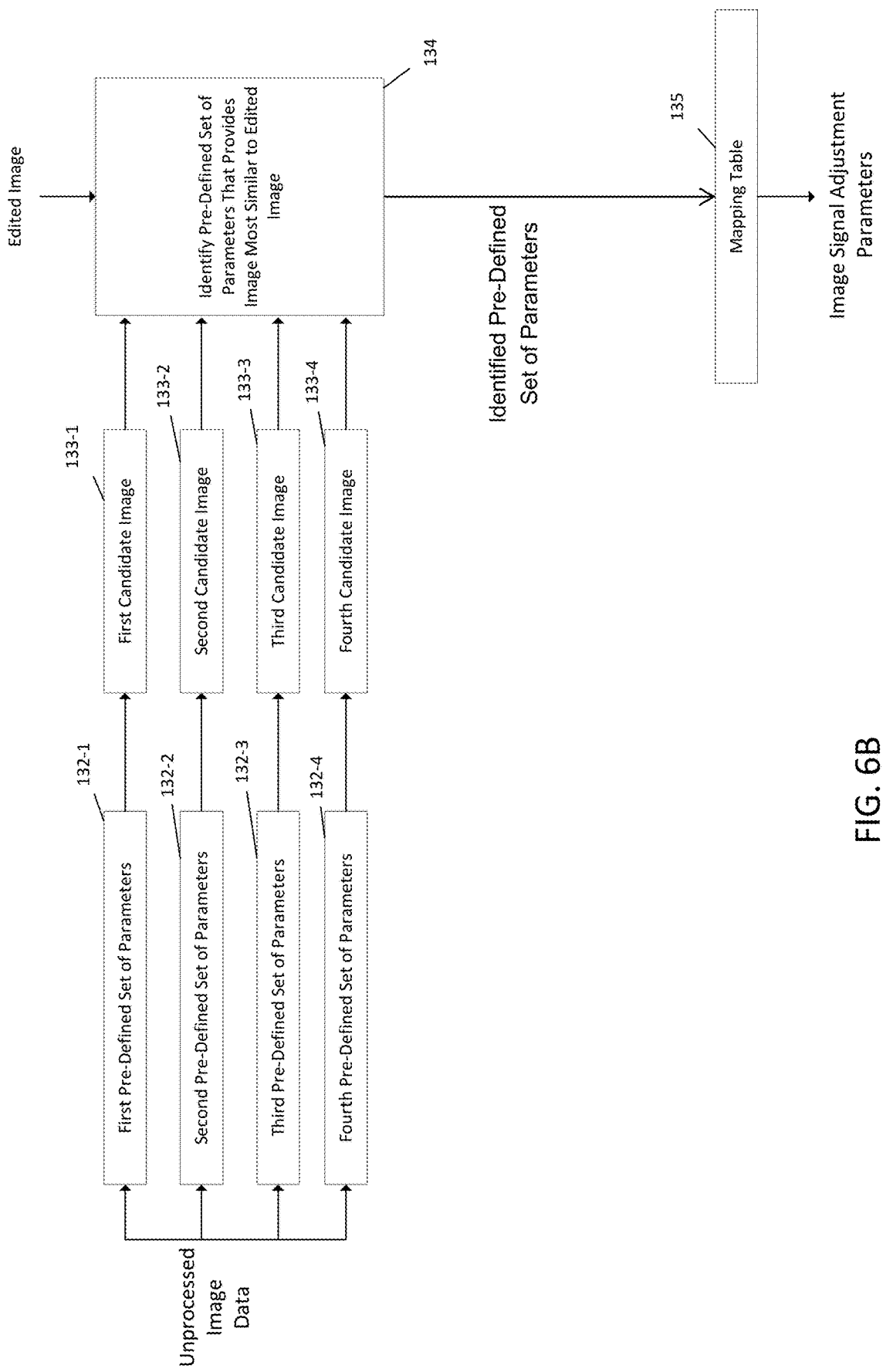

FIGS. 6A and 6B show examples of identifying image signal processor adjustment parameters according to embodiments.

As discussed above, process 130 may be performed to identify image signal processor adjustment parameters. The process 130 may be based on an original image that is a processed display-referred image and an edited version of the original image that is also a display-referred image. Unprocessed image data that is similar to raw-RGB data generated by the image sensor may be generated, or recovered, based on the original image. The process 130 may analyze the unprocessed image data and the edited image to identify how the image signal processor could be modified to produce images that are more similar to the edited image.

The parameters of the image signal processor may be different than edits to the original image.

For example, the image signal processor may have m adjustable parameters, m being a positive integer. The m parameters of the image signal processor may include white-balance, chroma-enhancement, skin-enhancement, selective-color-enhancement, noise reduction, lens shading correction, color correction, gamma correction, sharpness enhancement, auto exposure correction, auto focus correction, de-mosaicing, color space conversion, hue, saturation, contrast, etc. Each of the parameters may have one or more settings that may be set within a bounded range.

For example, white-balance parameters of the image signal processor may control whether a white color object in an image appears to be white. In this regard, the color of an object is affected by the lighting conditions under which the object is viewed. The white balance parameters remove unrealistic color casts from an image. For example, the white balance parameters may include a color temperature, a red offset, a red gain, a green offset, a green gain, a blue offset and a blue gain.

For example, chroma-enhancement parameters of the image signal processor may be control colorfulness or saturation of an image to be increased. For example, saturation parameters of the image signal processor may control the saturation of different color components, such as red, green and blue color components. For example, selective-color-enhancement of the image signal processor parameters may control intensity or saturation of specific colors. For example, skin-enhancement parameters of the image signal processor may control enhance colors of human skin.

For example, hue parameters of the image signal processor may control the hue of red, green and blue color components.

For example, contrast parameters of the image signal processor may control brightness levels between light and areas of an image.

For example, noise reduction parameters of the image signal processor may control how electronic noise, which increases with higher ISO settings or slower shutter speeds, is removed from image signal information. For example, the noise reduction parameters may reduce diverse color or pattern noise while preserving texture details.

For example, the lens correction parameters of the image signal processor may compensate for distortion due to the lens. The lens correction parameters may include lens shading correction parameters, chromatic aberration parameters, and lens distortion parameters.

For example, gamma correction parameters of the image signal processor may control how nonlinear information is generated based on linear image information received form an image sensor.

For example, sharpness enhancement parameters of the image signal processor may control how the image signal processor adjusts sharpness of an image. The sharpness enhancement parameters may include an intensity parameter, a radius parameter, and a detail parameter.

For example, auto exposure correction parameters of the image signal processor may control what shutter speeds, aperture settings and ISO settings based on how much light is received at the image sensor.

For example, auto focus correction parameters of the image signal processor control how the image signal processor corrects adjustment of focus.

For example, de-mosaicing parameters of the image signal processor may control how the image signal processor calculates and interpolates the color received by each pixel by analyzing color information around the pixel. For example, these parameters control how colors other than the pixel colors, which for example are limited to red, green and blue, are interpreted.

For example, color space conversion parameters of the image signal processor may control how the image signal processor translates an image from one color space to another color space.

As shown in FIG. 6A, an analysis process may be performed for each of the m parameters of the image signal processor. Embodiments are not limited to performing analysis for each of the m parameters, and according to embodiments, analysis may be performed for any number or any combination of the m parameters. For example, analysis may be performed for only one of the parameters, only two of the parameters, (m−1) of the parameters, or all of the parameters. Additionally, embodiments are not limited to the specific parameters discussed herein, and additional or modified parameters may be analyzed.

As shown in FIG. 6A, the process 130 includes analyzing each of the parameters P1 through Pm. The first parameter P1 is analyzed in operation 131-1. In operation 131-1, it is identified whether the first parameter P1 could be modified so that an image output by the image signal processor is more similar to the edited image. For example, the first parameter P1 may correspond to white balance. A parameter that provides an output most similar to the edited image may be identified from a white balance parameter space. A white balance adjustment parameter may be identified based on the identified white balance parameter and a current white balance parameter.

The second parameter P2 is analyzed in operation 131-2. In operation 131-2, it is identified whether the second parameter P2 could be modified so that an image output by the image signal processor is more similar to the edited image. For example, the second parameter P2 may correspond to saturation. A parameter that provides an output most similar to the edited image may be identified from a saturation parameter space. A saturation adjustment parameter may be identified based on the identified saturation parameter and a current saturation parameter.

The third parameter P3 is analyzed in operation 131-3. In operation 131-3, it is identified whether the third parameter P3 could be modified so that an image output by the image signal processor is more similar to the edited image. For example, the third parameter P3 may correspond to contrast. A parameter that provides an output most similar to the edited image may be identified from a contrast parameter space. A contrast adjustment parameter may be identified based on the identified contrast parameter and a current contrast parameter.

The mth parameter Pm is analyzed in operation 131-$m$. In operation 131-$m$, it is identified whether the mth parameter Pm could be modified so that an image output by the image signal processor is more similar to the edited image. For example, the mth parameter Pm may correspond to skin tone. A parameter that provides an output most similar to the edited image may be identified from a skin tone parameter space. A skin tone adjustment parameter may be identified based on the identified skin tone parameter and a current skin tone parameter.

In operation 135, a mapping table corresponding to the results of each analysis may be generated. Image signal processor adjustment parameters may be provided to the image signal processor. Embodiments are not limited to a mapping table, and other processes for generating image signal processor adjustment parameters may be used. In some embodiments the current parameters of the image signal processor may be input to the mapping table 135 or to the analysis operations 131.

Embodiments are not limited to analyzing each parameter individually. For example, according to embodiments a plurality of pre-defined sets of parameters may be provided. As shown in FIG. 6B, analysis may be performed on the plurality of pre-defined sets of parameters to identify a pre-defined set of parameters that would control the image signal processor to output an image similar to the edited image based on the recovered unprocessed image data. Although four sets of pre-defined sets of parameters are illustrated in FIG. 6B, embodiments are not limited thereto. For example, there may be hundreds of pre-defined sets, thousands of pre-defined sets or tens of thousands of pre-defined sets. Each of the plurality of pre-defined sets may include a parameter for each of the m parameters. For example, a first pre-defined set 132-1 may include a first value for the first parameter P1, a first value for the second parameter P2, a first value for the third parameter P3 and a first value for the mth parameter. A second pre-defined set 132-2 may include a second value for the first parameter P1, a second value for the second parameter P2, a second value for the third parameter P3 and a second value for the mth parameter. A third pre-defined set 132-3 may include a third value for the first parameter P1, a third value for the second parameter P2, a third value for the third parameter P3 and a third value for the mth parameter. A fourth pre-defined set 132-4 may include a fourth value for the first parameter P1, a fourth value for the second parameter P2, a fourth value for the third parameter P3 and a fourth value for the mth parameter. Some of the parameters in different sets may have the same value. For example, the fourth value for the first parameter P1 may be the same as the first value for the first parameter P1.

According to embodiments, candidate images may be generated based on each of the pre-defined sets of parameters. For example, first candidate image 133-1 may be generated based on the first pre-defined set of parameters 132-1 second candidate image 133-2 may be generated based on the second pre-defined set of parameters 132-2, third candidate image 133-3 may be generated based on the third pre-defined set of parameters 132-3, and fourth candidate image 133-4 may be generated based on the fourth pre-defined set of parameters 132-4.

In operation 134, the candidate image that is most similar to the edited image may be identified. Based on the identified candidate image, one of the pre-defined sets of parameters may be identified. The mapping table 135 may be updated based on each of the parameters in the identified pre-defined set.

Figure 7:
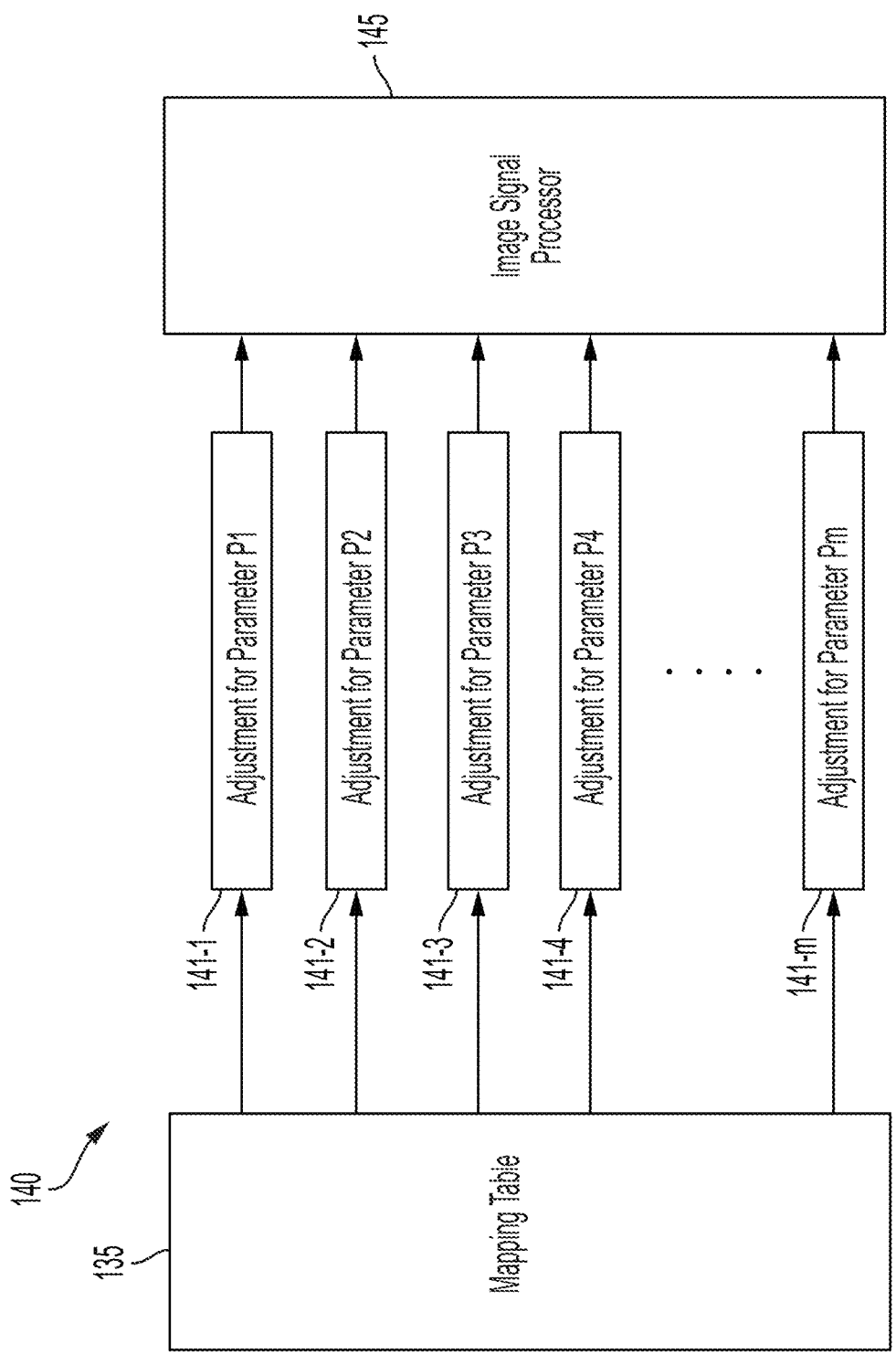
FIG. 7 shows an example of updating image process processor parameters according to embodiments.

FIG. 7 shows an example of updating image process processor parameters according to embodiments. As shown, m adjustment parameters 141-1 through 141-m are provided to the image signal processor in operation 140. The image signal processor may then be updated based on the received image signal processor parameters.

Because the image signal processor has been updated based on the adjustment parameters, the image signal processor is now personalized. When a command to capture a new image is received, the image signal processor will operate based on the updated image signal processor parameters.

For example, if an image has been edited to appear brighter, then the process 130 may identify that the auto-exposure processing of the image signal processor could be adjusted so that a brighter image is output by the image signal processor. Then, in the process 140 the image signal processor parameters are adjusted so that unprocessed image data is generally exposed to a higher level. As multiple images are edited over time, similar edits to brightness levels may allow for the auto-exposure parameters of the image signal processor to be optimized according to the user's preferences.

For example, if an image has been edited so that the colors appear more yellow and/or red, then the process 130 may identify that the white balance parameters of the image signal processor could be adjusted so that a warmer image is output by the image signal processor. Then, in the process 140 the image signal processor parameters are adjusted so that unprocessed image data is generally exposed to a warmer color temperature. As multiple images are edited over time, similar edits to yellow and/or red colors may allow for the white balance parameters of the image signal processor to be optimized according to the user's preferences.

According to embodiments, the adjustments to the image signal processor parameters may be made incrementally so that significant changes to the image signal processor parameters are not made at one time. For example, each time a parameter is adjusted, the adjustment may be limited to a threshold percentage. For example, the threshold percentage may be 1%. By limiting the amount a parameter may be adjusted at one time, issues arising when an image is accidentally modified in an unintended manner may be avoided. For example, if an image is accidentally edited to go all "black", the image signal processor parameters should not suddenly process all future captured images to black. Embodiments are not limited to the 1% threshold percentage, and other threshold percentages, such as 5% or 10%, may be utilized. Additionally, according to embodiments the threshold percentage may be changeable via a user interface.

According to embodiments, default image signal process parameters and check points of the image signal processor parameters may be stored on the device so that the default parameters or previous parameters may be reverted to. For example, a check point may be added every 100 updates. Additionally, a check point may be manually added based on a user selection made via the user interface. In this regard, if the image signals process parameters are providing undesirable results, then the image signals process parameters may be set to the default image signals process parameters, or to those indicated by one of the check points. The image signals process parameters may be reverted to default image signals process parameters or those indicated by one of the check points by user input through the user interface.

Figure 8:
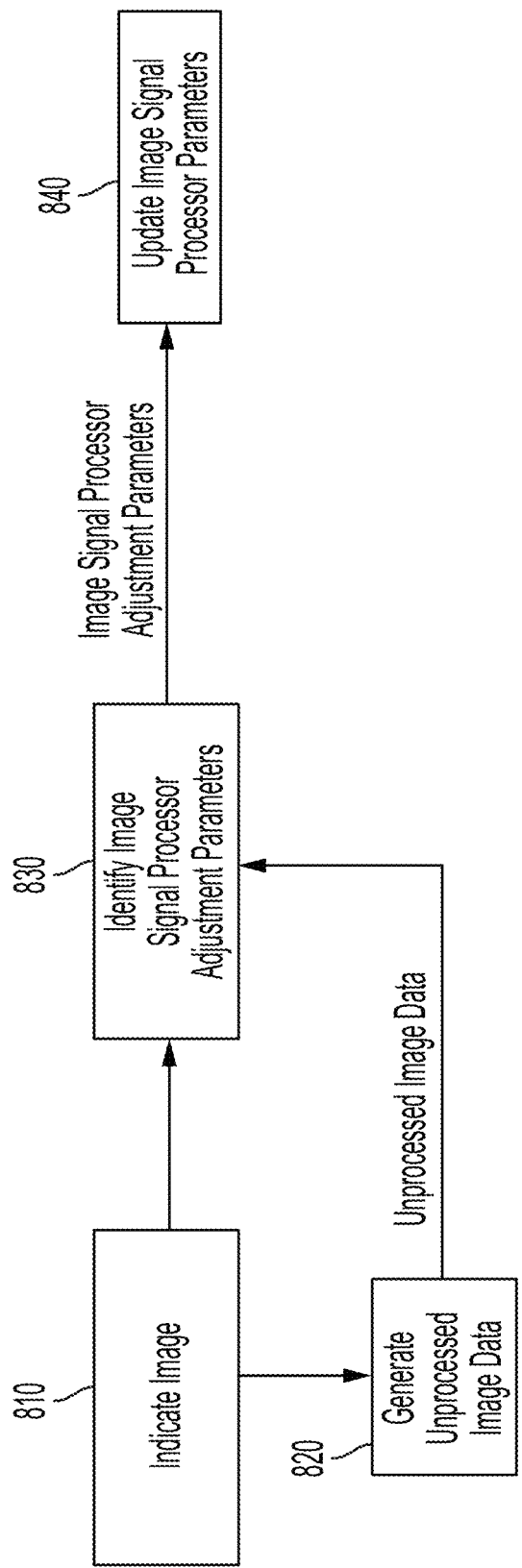
FIG. 8 is a diagram of an overview of a process or customizing parameter settings of an image signal processor of a camera of a mobile device by indirectly observing the types of images that are identified on the mobile device according to embodiments.

FIG. 8 is a diagram of an overview of a process or customizing parameter settings of an image signal processor of a camera of a mobile device by indirectly observing the types of images that are identified on the mobile device according to embodiments. For example, an image may be identified when the image is "liked" or "favorited" on a social media platform.

As shown, an image may be indicated in process 810. For example, an image may be indicated when the image is "liked" or "favorited" on a social media platform. For example, the image may be indicated through a user interface. For example, the image may be a processed display-referred image.

As shown, in process 820, unprocessed image data that is similar to raw-RGB data generated by the image sensor is generated when the image is indicated. For example, if the image is indicated, process 820 may be performed to generate unprocessed image data corresponding to the indicated image.

In process 830, image signal processor adjustment parameters may be identified based on the indicated image and the unprocessed image data generated in process 820. For example, the process 830 may be performed using an artificial intelligence-based image signal processor network. The artificial intelligence network may be used to estimate the necessary image signal processor parameters that would make the unprocessed image data appear more like the indicated image. This artificial intelligence network may be learned by processing many unprocessed (i.e., raw-RGB) sensor images with a wide range of image signal processor parameters.

Figure 9:
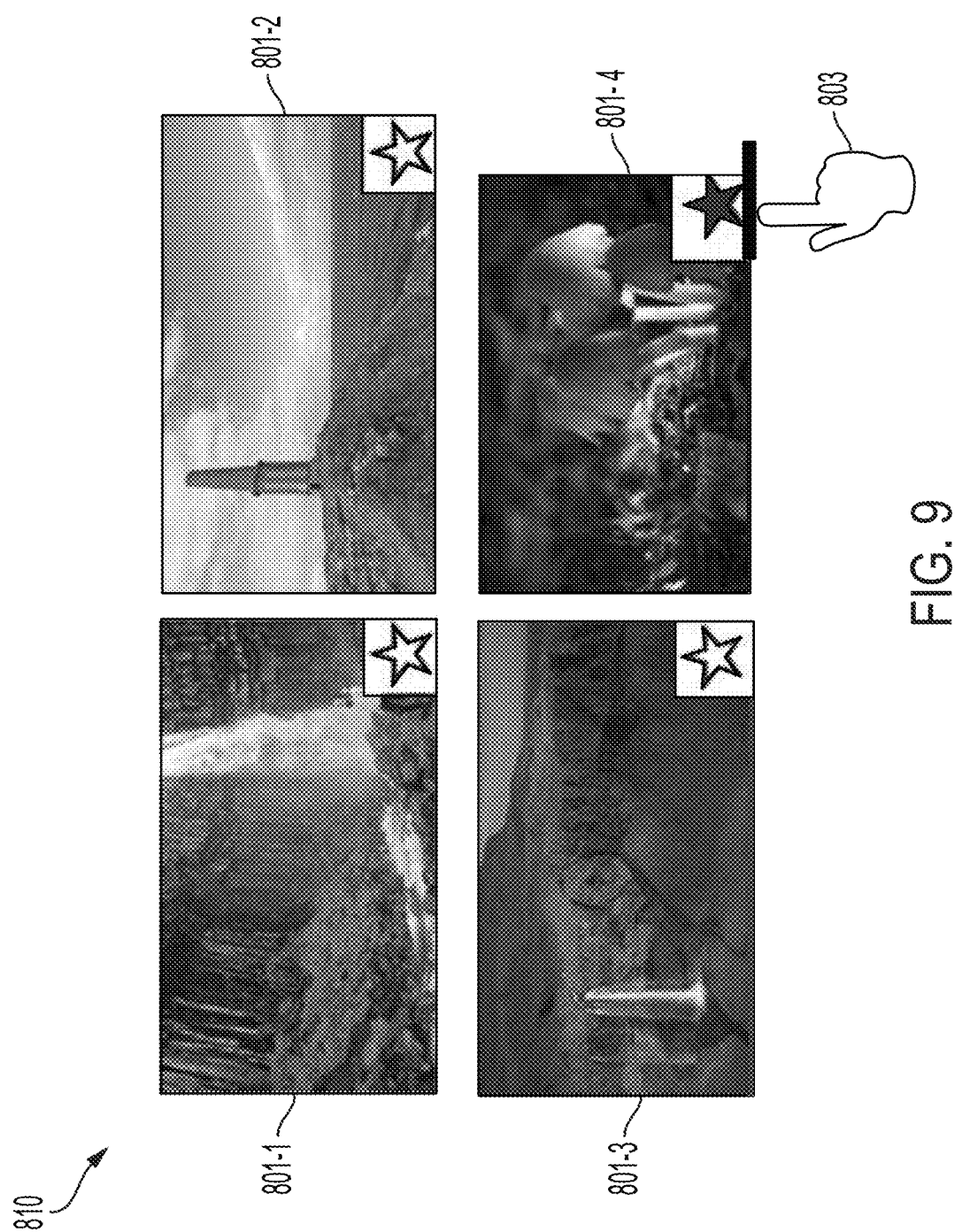
FIG. 9 illustrates an example of an image being indicated according to embodiments.

FIG. 9 illustrates an example of an image being indicated in process 810.

As shown in FIG. 9, images 801-1, 801-2, 801-3, 801-4 may be displayed on a user interface of the mobile device. One of the images may be indicated by user selection 803. For example, image 801-4 may be indicated by the user selection 803.

Figure 10:
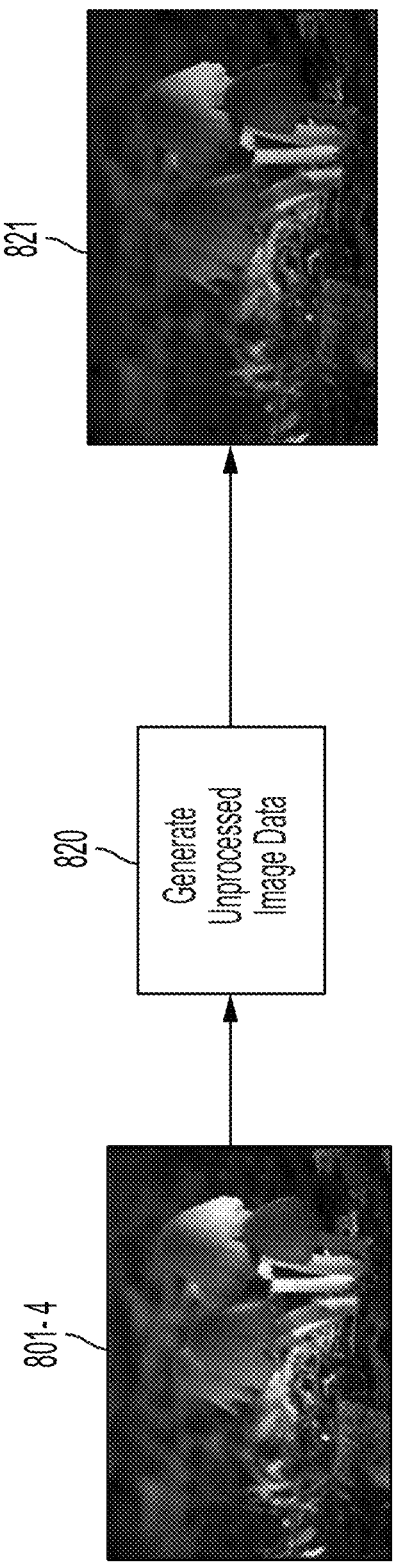
FIG. 10 shows an example of generating, or recovering, unprocessed image data corresponding to an indicated image according to embodiments.

FIG. 10 shows an example of generating, or recovering, unprocessed image data corresponding to an indicated image according to embodiments.

As discussed above, embodiments relate to generating unprocessed image data based on processed display-referred image data and metadata appended to the processed display-referred image data. Embodiments also relate to generating unprocessed image data using a neural network.

Because the indicated image may not have been generated using the mobile device, the metadata discussed above for generating the unprocessed image data may not be present. The mobile device may determine whether the metadata is present, and if so then the metadata may be used to generate the unprocessed image data in a manner similar to the processes discussed above. If the metadata is not present, then an artificial intelligence-based neural network that has been trained with random images, such as those from the internet, to convert the indicated image to unprocessed image data. Any metadata that is provided with the indicated image may also be used by the artificial intelligence network.

Processes 830 and process 840 may be substantially similar to process 130 and process 140, respectively.

As different images are indicated through, for example, various social media networks, the image signal processor of the mobile device becomes customized and will produce images more similar to those indicated on the social media networks.

According to embodiments, an image signal processor may be configured to process image data of different image categories based on different image signal processor parameters. For example, the image signal processor may include P sets of parameters for P image categories. P may be a positive integer. The P image categories may include portrait images, landscape images, food images, animal images, etc. Image signal processor parameters for each of the image categories may be stored on the image processor. When an image is captured, the image may be categorized and processed according to image signal processor parameters corresponding to one of the categories. According to embodiments, the captured image may be automatically categorized. According to embodiments, the image may be categorized based on a selection made through a user interface.

For example, when an image is edited in process 110, a category of the image may be identified and the image signal processor parameters that correspond to the identified category may be updated independent of the image signal processor parameters that correspond to the other categories.

For example, when an image is indicated in process 810, a category of the image may be identified and the image signal processor parameters that correspond to the identified category may be updated independent of the image signal processor parameters that correspond to the other categories.

Figure 11:
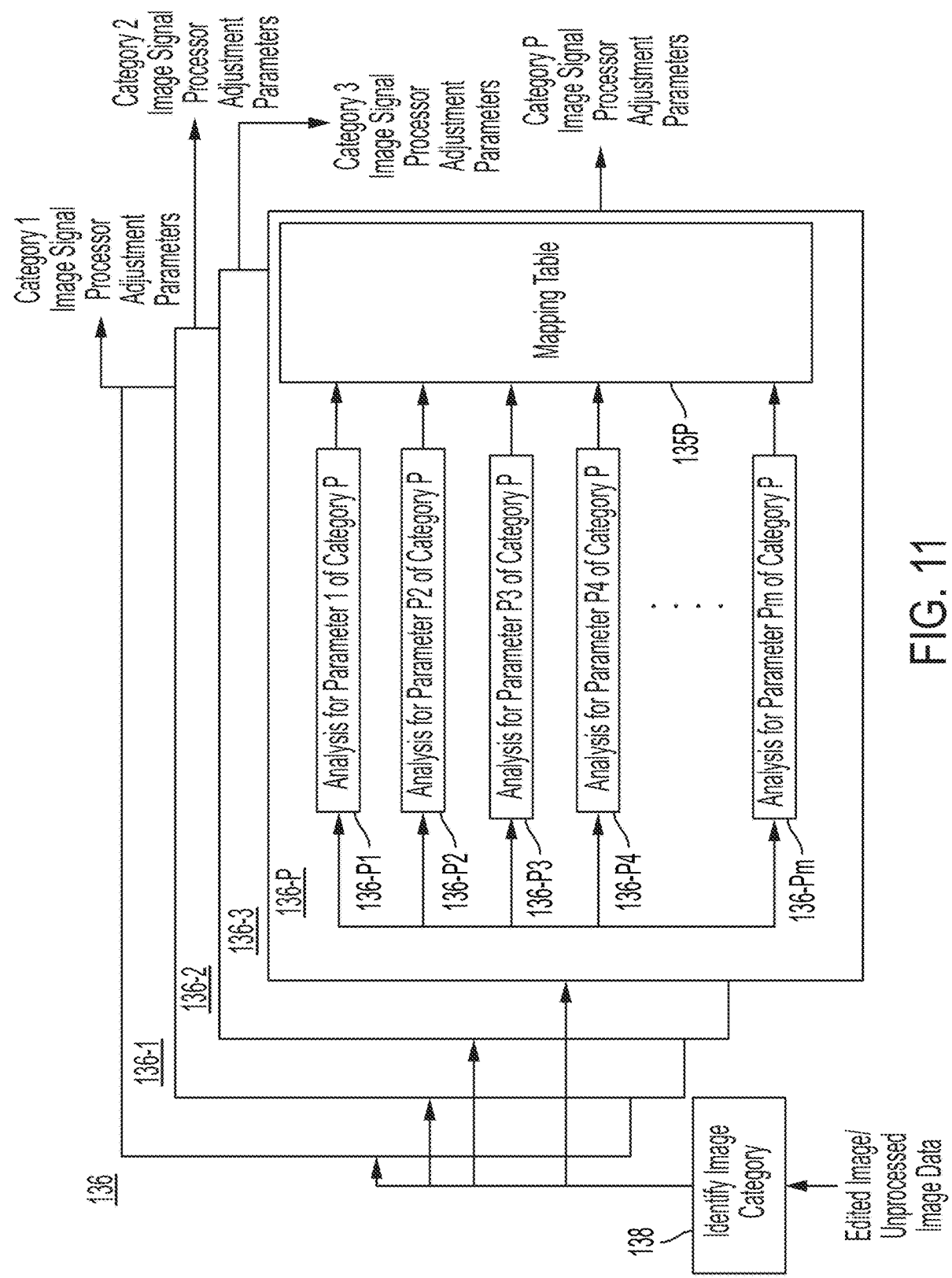
FIG. 11 illustrates an example of generating parameters for different image categories according to embodiments.

FIG. 11 illustrates an example of generating parameters for different image categories according to embodiments.

As shown, process 136 may include P processes 136-1 through 136-P for generating image signal processor adjustment parameters for each of the P image categories. The category of an edited image (or an indicated image) may be identified in process 138. Based on which image category is identified, one of the P processes 136-1 through 136-P may be performed. Image signal processor adjustment parameters for a corresponding image category may be identified by the one of the P processes.

Although FIG. 11 illustrates performing an analysis process for each of the m parameters for each of the P categories, embodiments are not limited thereto. For example, as discussed above with reference to FIG. 6B, a plurality of pre-defined sets of parameters may be provided. Analysis may be performed on the plurality of pre-defined sets of parameters to identify a pre-defined set of parameters that would control the image signal processor to output an image similar to the edited image based on the recovered unprocessed image data. In a somewhat similar manner, according to embodiments, one of the pre-defined sets of parameters may be selected for each of the P categories.

Figure 12:
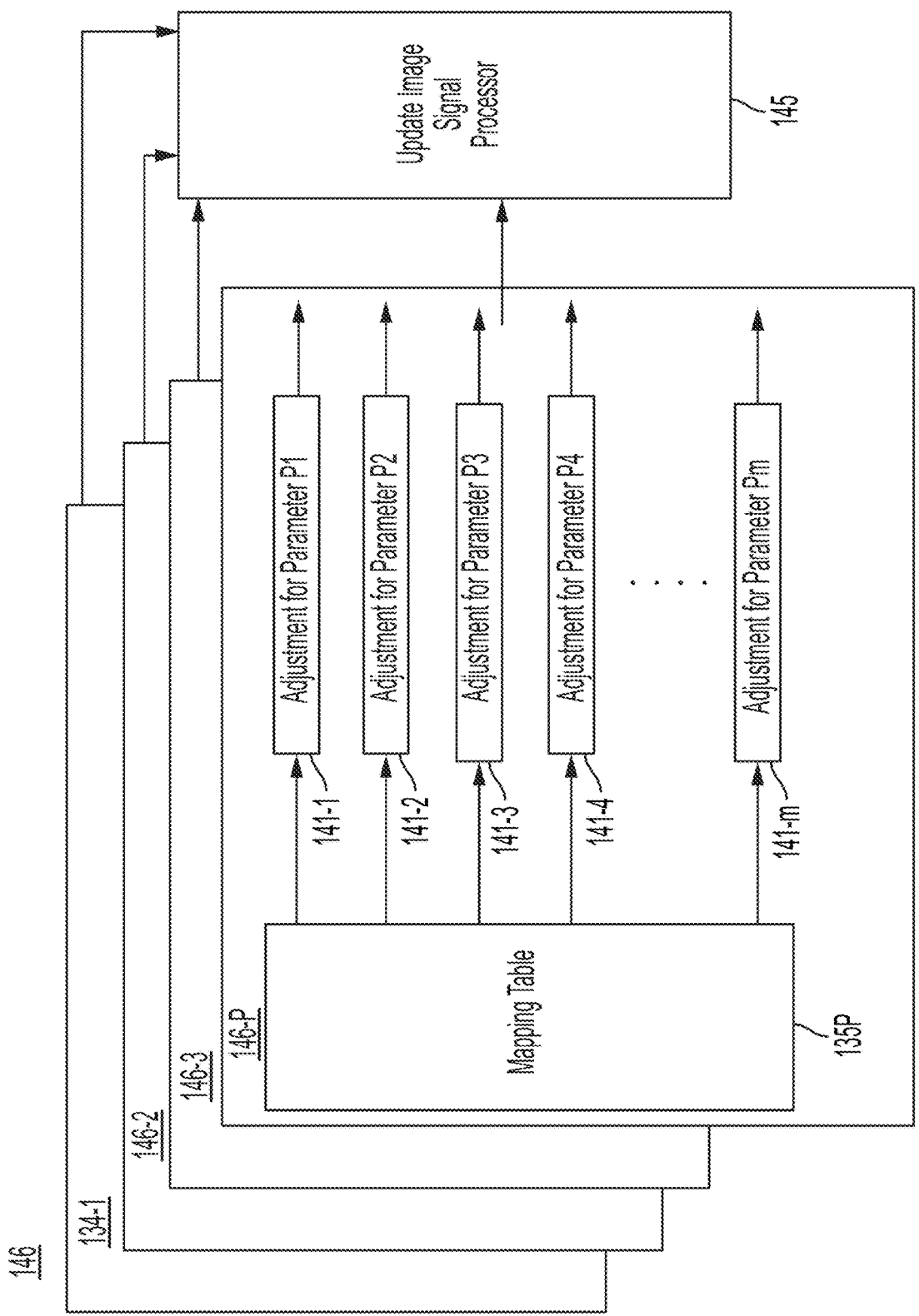
FIG. 12 illustrates an example of updating image signal processor parameters for each of the P image categories according to embodiments.

FIG. 12 illustrates an example of updating image signal processor parameters for each of the P image categories according to embodiments.

As shown, process 146 may include P processes 146-1 through 146-P for updating the image signal processor parameters of each of the P image categories. The adjustment parameters are identified for an individual image category, and the image signal processor is updated in operation 145 based on the adjustment parameters for a corresponding one of the P image categories.

Figure 13:
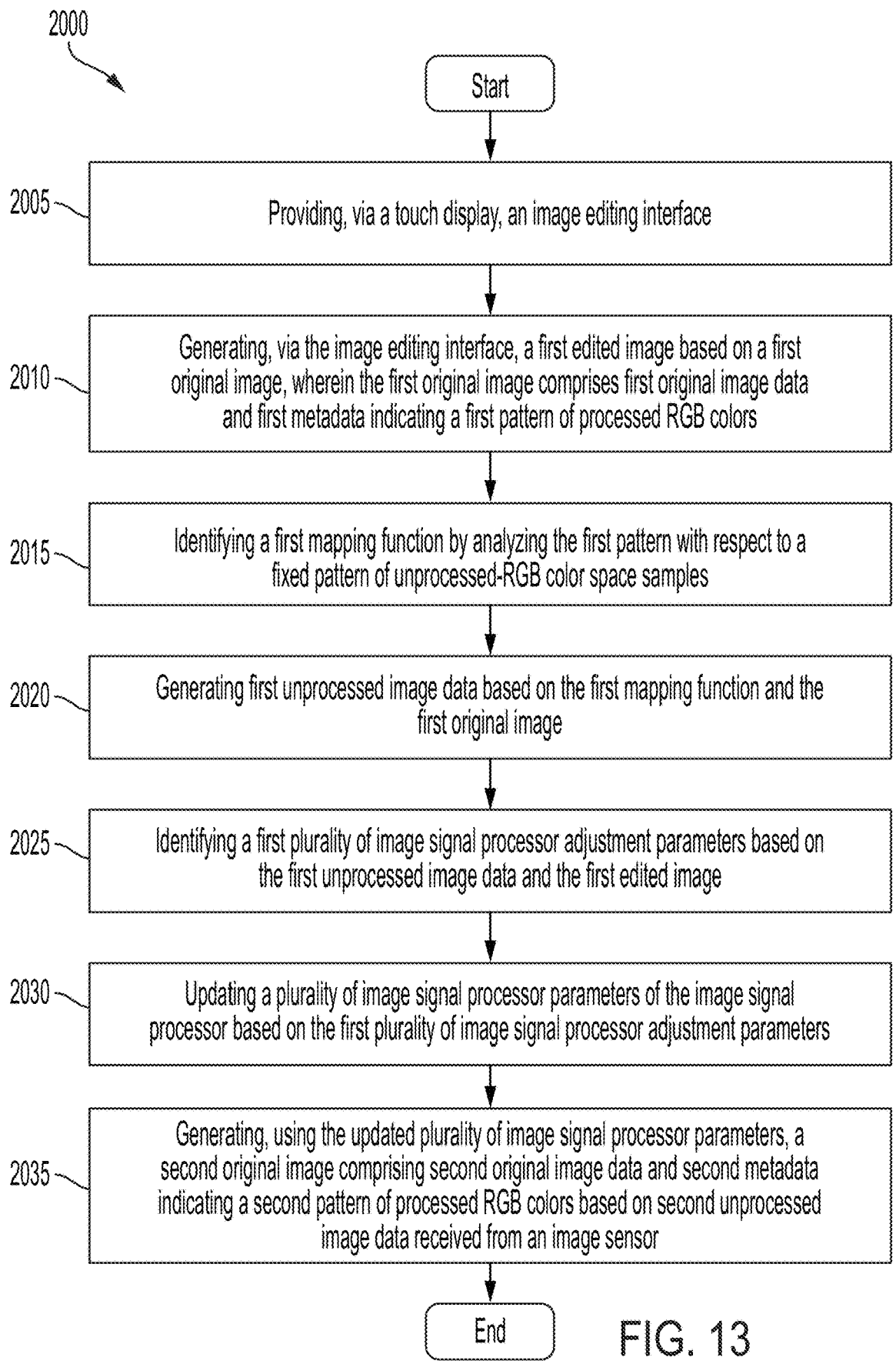
FIG. 13 is a flowchart of a method 2000 of customizing image signal processor parameters according to embodiments.

FIG. 13 is a flowchart of a method 2000 of customizing image signal processor parameters according to embodiments.

The method 2000 may be performed by the mobile device 1000.

In operation 2005 the method includes providing, via a touch display, an image editing interface.

In operation 2010, the method includes generating, via the image editing interface, a first edited image based on a first original image, wherein the first original image comprises first original image data and first metadata indicating a first pattern of processed RGB colors.

In operation 2015, the method includes identifying a first mapping function by analyzing the first pattern with respect to a fixed pattern of unprocessed-RGB color space samples.

In operation 2020, the method includes generating first unprocessed image data based on the first mapping function and the first original image.

In operation 2025, the method includes identifying a first plurality of image signal processor adjustment parameters based on the first unprocessed image data and the first edited image.

In operation 2030, the method includes updating a plurality of image signal processor parameters of the image signal processor based on the first plurality of image signal processor adjustment parameters.

In operation 2035, the method includes generating, using the updated plurality of image signal processor parameters, a second original image comprising second original image data and second metadata indicating a second pattern of processed RGB colors based on second unprocessed image data received from an image sensor.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term "component" is intended to be broadly construed as hardware, firmware, or a combination of hardware and software.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

While embodiments have been described with reference to the figures, it will be understood by those of ordinary skill in the art that various changes in form and details may be made therein without departing from the spirit and scope as defined by the following claims.

What is claimed is:

1. An apparatus for customizing camera parameters, the apparatus comprising:
    an image sensor;
    an image signal processor;
    a touch display;
    a memory storing instructions; and
    a processor configured to execute the instructions to:
        provide, via the touch display, an image editing interface;
        generate, via the image editing interface, a first edited image based on a first original image, wherein the first original image comprises first original image data and first metadata indicating a first pattern of processed RGB colors;
        identify a first mapping function by analyzing the first pattern with respect to a fixed pattern of unprocessed-RGB color space samples;
        generate first unprocessed image data based on the first mapping function and the first original image;
        identify a first plurality of image signal processor adjustment parameters based on the first unprocessed image data and the first edited image;
        update a plurality of image signal processor parameters of the image signal processor based on the first plurality of image signal processor adjustment parameters; and
        control the image signal processor to generate, using the updated plurality of image signal processor parameters, a second original image comprising second original image data and second metadata indicating a second pattern of processed RGB colors based on second unprocessed image data received from the image sensor.

2. The apparatus of claim 1, wherein the processor is further configured to execute the instructions to generate the second pattern of processed RGB colors by processing the fixed pattern of the unprocessed-RGB color space samples using the updated plurality of image signal processor parameters together with the second unprocessed image data.

3. The apparatus of claim 1, wherein the processor is further configured to execute the instructions to:
    provide, via the touch display, an image gallery interface comprising a plurality of gallery images;
    receive, via the image gallery interface, an indication corresponding to a first gallery image from among the plurality of gallery images;
    generate first gallery unprocessed image data corresponding to the first gallery image by analyzing the first gallery image using a neural network;
    identify a second plurality of image signal processor adjustment parameters based on the first gallery unprocessed image data and the first gallery image indicated via the image gallery interface; and
    update the plurality of image signal processor parameters of the image signal processor based on the second plurality of image signal processor adjustment parameters.

4. The apparatus of claim 1, wherein the processor is further configured to execute the instructions to:
    control the image signal processor to sample third unprocessed image data received from the image sensor;
    control the image signal processor to generate third original image data by processing the third unprocessed image data using the updated plurality of image signal processor parameters; and
    generate a third image by appending the samples of the third unprocessed image data to the third original image data.

5. The apparatus of claim 1, wherein the unprocessed-RGB color space samples of the fixed pattern represent uniform samples of a full color space of the image sensor,
    wherein each processed RGB color of the first pattern respectively corresponds to one unprocessed-RGB color space sample of the fixed pattern, and
    wherein the processor is further configured to identify the first mapping function by comparing each processed RGB color of the first pattern with a corresponding unprocessed-RGB color space sample of the fixed pattern.

6. The apparatus according to claim 1, wherein the processor is further configured to execute the instructions to identify the first plurality of image signal processor adjustment parameters using a neural network, and
wherein the neural network is trained based on a plurality of unprocessed images, each of which is processed using a plurality of image signal processor parameters.

7. The apparatus according to claim 1, wherein the plurality of image signal processor parameters comprise a first plurality of image signal processor parameters corresponding to a first image category and a second plurality of image signal processor parameters corresponding to a second image category, and
wherein the processor is further configured to execute the instructions to:
identify whether the first edited image corresponds to the first image category or the second image category;
update the first plurality of image signal processor parameters according to the first plurality of image signal processor adjustment parameters based on the first edited image corresponding to the first image category; and
update the second plurality of image signal processor parameters according to the first plurality of image signal processor adjustment parameters based on the first edited image corresponding to the second image category.

8. The apparatus according to claim 1, wherein the processor is further configured to execute the instructions to individually identify each of the first plurality of image signal processor adjustment parameters.

9. The apparatus according to claim 1, wherein a plurality of pre-defined sets of parameters are stored in the memory,
wherein each of the plurality of pre-defined sets of parameters comprises a plurality of parameters respectively corresponding to the plurality of image signal processor parameters, and
wherein the processor is further configured to execute the instructions to:
identify one of the plurality of pre-defined sets of parameters based on the first unprocessed image data and the first edited image; and
identify the first plurality of image signal processor adjustment parameters based on the plurality of parameters of the identified pre-defined set of parameters.

10. A method of customizing parameters of an image signal processor of a mobile device, the method comprising:
providing, via a touch display, an image editing interface;
generating, via the image editing interface, a first edited image based on a first original image, wherein the first original image comprises first original image data and first metadata indicating a first pattern of processed RGB colors;
identifying a first mapping function by analyzing the first pattern with respect to a fixed pattern of unprocessed-RGB color space samples;
generating first unprocessed image data based on the first mapping function and the first original image;
identifying a first plurality of image signal processor adjustment parameters based on the first unprocessed image data and the first edited image;
updating a plurality of image signal processor parameters of the image signal processor based on the first plurality of image signal processor adjustment parameters; and
generating, using the updated plurality of image signal processor parameters, a second original image comprising second original image data and second metadata indicating a second pattern of processed RGB colors based on second unprocessed image data received from an image sensor.

11. The method of claim 10, further comprising generating the second pattern of processed RGB colors by processing the fixed pattern of the unprocessed-RGB color space samples using the updated plurality of image signal processor parameters together with the second unprocessed image data.

12. The method of claim 10, further comprising:
providing, via the touch display, an image gallery interface comprising a plurality of gallery images;
receiving, via the image gallery interface, an indication corresponding to a first gallery image from among the plurality of gallery images;
generating first gallery unprocessed image data corresponding to the first gallery image by analyzing the first gallery image using a neural network;
identifying a second plurality of image signal processor adjustment parameters based on the first gallery unprocessed image data and the first gallery image indicated via the image gallery interface; and
updating the plurality of image signal processor parameters of the image signal processor based on the second plurality of image signal processor adjustment parameters.

13. The method of claim 10, further comprising:
sampling third unprocessed image data received from the image sensor;
generating third original image data by processing the third unprocessed image data using the updated plurality of image signal processor parameters; and
generating a third image by appending the samples of the third unprocessed image data to the third original image data.

14. The method of claim 10, wherein the unprocessed-RGB color space samples of the fixed pattern represent uniform samples of a full color space of the image sensor,
wherein each processed RGB color of the first pattern respectively corresponds to one unprocessed-RGB color space sample of the fixed pattern, and
wherein the identifying the first mapping function comprises comparing each processed RGB color of the first pattern with a corresponding unprocessed-RGB color space sample of the fixed pattern.

15. The method according to claim 10, further comprising identifying the first plurality of image signal processor adjustment parameters using a neural network,
wherein the neural network is trained based on a plurality of unprocessed images, each of which is processed using a plurality of image signal processor parameters.

16. The method according to claim 10, wherein the plurality of image signal processor parameters comprise a first plurality of image signal processor parameters corresponding to a first image category and a second plurality of image signal processor parameters corresponding to a second image category, and
wherein the method further comprises:
identifying whether the first edited image corresponds to the first image category or the second image category;

updating the first plurality of image signal processor parameters according to the first plurality of image signal processor adjustment parameters based on the first edited image corresponding to the first image category; and updating the second plurality of image signal processor parameters according to the first plurality of image signal processor adjustment parameters based on the first edited image corresponding to the second image category.

17. The method according to claim 10, wherein the identifying the first plurality of image signal processor adjustment parameters comprises individually identifying each of the first plurality of image signal processor adjustment parameters.

18. The method according to claim 10, wherein the identifying the first plurality of image signal processor adjustment parameters comprises:
identifying one of a plurality of pre-defined sets of parameters based on the first unprocessed image data and the first edited image, wherein each of the plurality of pre-defined sets of parameters comprises a plurality of parameters respectively corresponding to the plurality of image signal processor parameters; and
identifying the first plurality of image signal processor adjustment parameters based on the plurality of parameters of the identified pre-defined set of parameters.

19. A non-transitory computer-readable storage medium storing instructions configured to cause a processor to:
provide, via a touch display, an image editing interface;
generate, via the image editing interface, a first edited image based on a first original image, wherein the first original image comprises first original image data and first metadata indicating a first pattern of processed RGB colors;
identify a first mapping function by analyzing the first pattern with respect to a fixed pattern of unprocessed-RGB color space samples;
generate first unprocessed image data based on the first mapping function and the first original image;
identify a first plurality of image signal processor adjustment parameters based on the first unprocessed image data and the first edited image;
update a plurality of image signal processor parameters of an image signal processor based on the first plurality of image signal processor adjustment parameters; and
generate, using the updated plurality of image signal processor parameters, a second original image comprising second original image data and second metadata indicating a second pattern of processed RGB colors based on second unprocessed image data received from an image sensor.

20. The non-transitory computer-readable storage medium of claim 19, wherein the instructions are further configured to cause the processor to generate the second pattern of processed RGB colors by processing the fixed pattern of the unprocessed-RGB color space samples using the updated plurality of image signal processor parameters together with the second unprocessed image data.

21. The non-transitory computer-readable storage medium of claim 19, wherein the instructions are further configured to cause the processor to:
provide, via the touch display, an image gallery interface comprising a plurality of gallery images;
receive, via the image gallery interface, an indication corresponding to a first gallery image from among the plurality of gallery images;
generate first gallery unprocessed image data corresponding to the first gallery image by analyzing the first gallery image using a neural network;
identify a second plurality of image signal processor adjustment parameters based on the first gallery unprocessed image data and the first gallery image indicated via the image gallery interface; and
update the plurality of image signal processor parameters of the image signal processor based on the second plurality of image signal processor adjustment parameters.

22. The non-transitory computer-readable storage medium of claim 19, wherein the instructions are further configured to cause the processor to:
sample third unprocessed image data received from the image sensor;
generate third original image data by processing the third unprocessed image data using the updated plurality of image signal processor parameters; and
generate a third image by appending the samples of the third unprocessed image data to the third original image data.

23. The non-transitory computer-readable storage medium of claim 19, wherein the unprocessed-RGB color space samples of the fixed pattern represent uniform samples of a full color space of the image sensor,
wherein each processed RGB color of the first pattern respectively corresponds to one unprocessed-RGB color space sample of the fixed pattern, and
wherein the instructions are further configured to cause the processor to identify the first mapping function by comparing each processed RGB color of the first pattern with a corresponding unprocessed-RGB color space sample of the fixed pattern.

24. The non-transitory computer-readable storage medium of claim 19, wherein the instructions are further configured to cause the processor to identify the first plurality of image signal processor adjustment parameters using a neural network, and
wherein the neural network is trained based on a plurality of unprocessed images, each of which is processed using a plurality of image signal processor parameters.

25. The non-transitory computer-readable storage medium of claim 19, wherein the instructions are further configured to cause the processor to identify the first plurality of image signal processor adjustment parameters by individually identifying each of the first plurality of image signal processor adjustment parameters.

26. The non-transitory computer-readable storage medium of claim 19, wherein the instructions are further configured to cause the processor to identify the first plurality of image signal processor adjustment parameters by:
identifying one of a plurality of pre-defined sets of parameters based on the first unprocessed image data and the first edited image, wherein each of the plurality of pre-defined sets of parameters comprises a plurality of parameters respectively corresponding to the plurality of image signal processor parameters; and
identifying the first plurality of image signal processor adjustment parameters based on the plurality of parameters of the identified pre-defined set of parameters.

* * * * *